United States Patent [19]

Kanbe et al.

[11] Patent Number: 5,381,254
[45] Date of Patent: Jan. 10, 1995

[54] METHOD FOR DRIVING OPTICAL MODULATION DEVICE

[75] Inventors: Junichiro Kanbe; Kazuharu Katagiri, both of Yokohama, Japan

[73] Assignee: Canon Kabushiki Kaisha, Tokyo, Japan

[21] Appl. No.: 865,630

[22] Filed: Apr. 9, 1992

Related U.S. Application Data

[63] Continuation of Ser. No. 302,083, Jan. 26, 1989, abandoned, which is a continuation of Ser. No. 139,130, Dec. 28, 1987, abandoned, which is a continuation of Ser. No. 701,765, Feb. 14, 1985, abandoned.

[30] Foreign Application Priority Data

Feb. 17, 1984 [JP]  Japan ................. 59-28274
Jul. 10, 1984 [JP]  Japan ................. 59-143481

[51] Int. Cl.⁶ ........................................ G02F 1/1343
[52] U.S. Cl. ............................... 359/54; 359/56; 345/53
[58] Field of Search ............. 350/332, 333, 350 S; 340/784, 805; 359/54, 56

[56] References Cited

U.S. PATENT DOCUMENTS

| | | | |
|---|---|---|---|
| 3,922,667 | 11/1975 | Ueda et al. | 340/805 |
| 3,975,726 | 8/1976 | Kawakami et al. | 350/332 |
| 4,158,860 | 6/1979 | Irie et al. | 350/333 X |
| 4,367,924 | 1/1983 | Clark et al. | 350/350 S |
| 4,449,123 | 5/1984 | Muranaga | 340/784 |
| 4,465,999 | 8/1984 | Tsuzuki et al. | 340/784 |
| 4,508,429 | 4/1985 | Nagae et al. | 350/332 |
| 4,529,271 | 7/1985 | Berreman et al. | 350/350 R |
| 4,548,476 | 10/1985 | Kaneko | 350/350 S |
| 4,563,059 | 1/1986 | Clark et al. | 350/350 S |
| 4,630,122 | 12/1986 | Morokawa | 350/333 X |
| 4,638,310 | 1/1987 | Ayliffe | 340/805 |
| 4,655,561 | 4/1987 | Kanbe et al. | 350/350 S |
| 4,702,560 | 10/1987 | Endo | 350/333 |
| 4,705,345 | 11/1987 | Ayliffe et al. | 350/350 S |
| 4,711,531 | 12/1987 | Masubuchi | 350/350 S |
| 4,715,688 | 12/1987 | Harada et al. | 350/350 S |
| 4,725,129 | 2/1988 | Kondo et al. | 350/350 S |
| 4,770,502 | 9/1988 | Kitazima et al. | 350/350 S |

FOREIGN PATENT DOCUMENTS

| | | | |
|---|---|---|---|
| 2449034 | 4/1975 | Germany | 350/350 R |
| 41995 | 4/1976 | Japan . | |
| 107216 | 8/1981 | Japan . | |
| 179890 | 10/1983 | Japan . | |
| 123825 | 7/1985 | Japan . | |
| 173591 | 9/1985 | Japan . | |

*Primary Examiner*—William L. Sikes
*Assistant Examiner*—Huy Mai
*Attorney, Agent, or Firm*—Fitzpatrick, Cella, Harper & Scinto

[57] ABSTRACT

A method for driving an optical modulation device having a group of scanning electrodes and a group of signal electrodes arranged so that picture elements are defined at the intersections therebetween and a bistable optical modulation material assuming one of two stable states applied between the groups of electrodes, by in a first phase orienting the bistable material at the picture elements on an N-th scanning electrode to one stable state, and applying a writing signal to the signal electrodes in synchronism with a scanning signal to the N-th scanning electrode while orienting the bistable material at the picture elements on an N+1-th scanning electrode to the one stable state. Also disclosed is a driving mode wherein a scanning signal is applied to the whole or a part of the scanning electrodes while, in phase therewith, a signal is applied to the whole or a part of the signal electrodes so that the optical modulation material is oriented to a first stable state, and a second step in which a scanning signal is applied to the whole or a part of the scanning electrodes while in phase therewith, a signal is applied to a selected signal electrode among the whole or a part of the signal electrodes so that the bistable optical modulation material is oriented to a second stable state.

29 Claims, 29 Drawing Sheets

F I G. 8A(a)
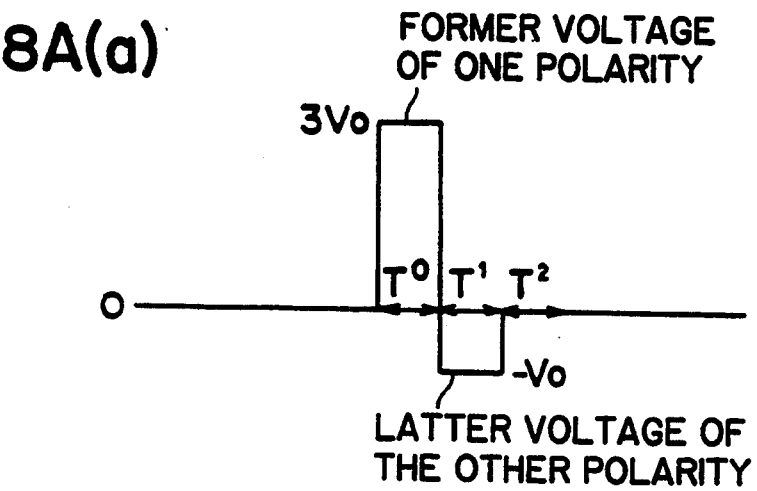
F I G. 8A(b)
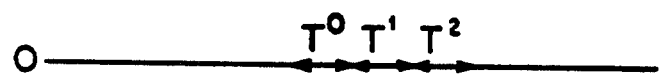
F I G. 8A(c)
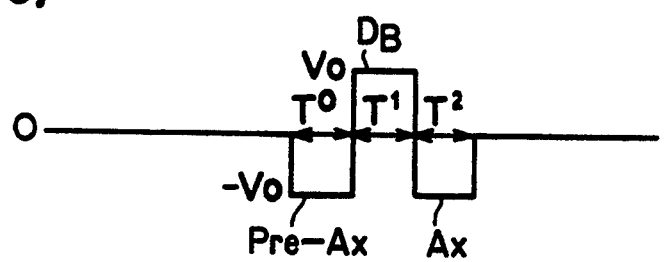

IW₁

IW₂

$IB_1 - S_S$ $IB_2 - S_S$ $IW_1 - S_S$ $IW_2 - S_S$

F I G. 10A(a)
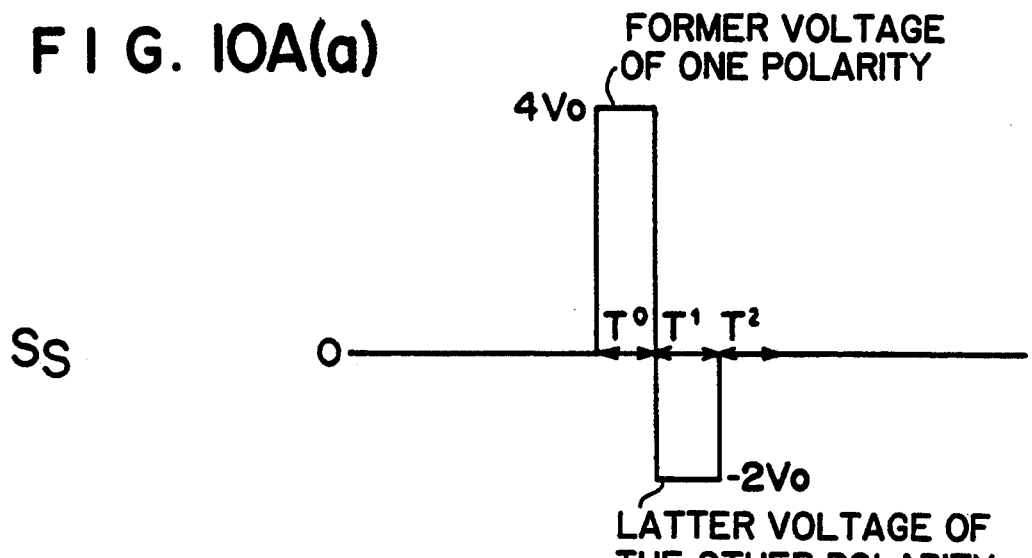
F I G. 10A(b)
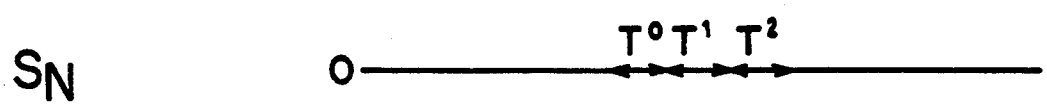
F I G. 10A(c)
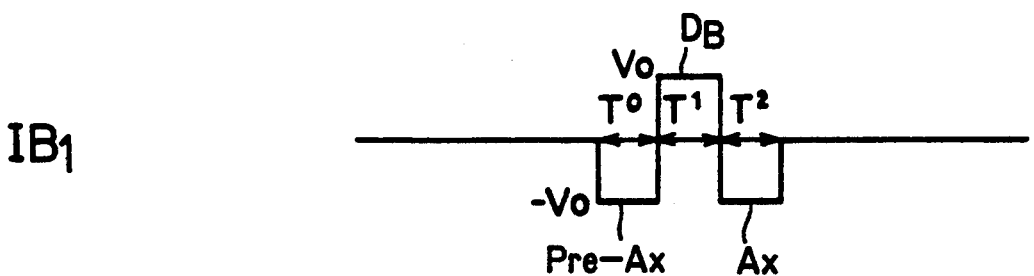

IB2

IW1

IW2

$IB_1-S_S$ $IB_2-S_S$ $IW_1-S_S$ $IW_2-S_S$

METHOD FOR DRIVING OPTICAL MODULATION DEVICE

This application is a continuation of application Ser. No. 07/302,083 filed Jan. 26, 1989, now abandoned which is a continuation of Ser. No. 07/139,130 filed on Dec. 28, 1987, now abandoned, which is a continuation of Ser. No. 06/701,765 filed on Feb. 14, 1985, now abandoned.

BACKGROUND OF THE INVENTION

The present invention relates to a method for driving an optical modulation device and more particularly a time-division or time-sharing driving method for driving an optical modulation device such as a display element, an optical shutter array and the like and especially for driving a ferroelectric liquid crystal device.

Liquid crystal display devices for displaying a pattern or information have been well known in which a plurality of scanning electrodes and a plurality of signal electrodes are arranged in the form of a matrix and liquid crystals are interposed between the scanning and signal electrodes, whereby a plurality of picture elements ("pixel") are defined. In order to drive such liquid crystal display devices, a time-division driving method is used in which an address signal is applied sequentially and periodically to the scanning electrodes and, in synchronism with the address signal, predetermined information signals are selectively applied to the signal electrodes in parallel. Such liquid crystal display devices and the methods for driving them have serious defects as will be described below.

A first defect is that it is difficult to increase the density of picture elements or the size of a picture. Liquid crystals which have been used in practice in liquid crystal display devices, because of their fast response and their low electric power consumption, are twisted nematic liquid crystals of the kind disclosed in, for instance, "Voltage Dependent Optical Activity of a Twisted Nematic Liquid Crystals", M. Schadt and W. Helfrich in Applied Physics Letters, Vol. 18, No. 4, (Feb. 15, 1971), pages 127–128. The liquid crystals of this kind assume a helical structure in which the molecules of a nematic liquid crystal having a positive dielectric anisotropy are twisted in the direction of the thickness of the crystal liquid and are arranged in parallel with each other between electrodes when an electric field is not applied. When an electric field is applied, the molecules of the nematic liquid crystal with a positive dielectric anisotropy are oriented in the direction of the electric field, causing optical modulation. In the case of a display device in which a liquid crystal of the kind described is used and which has a matrix of electrodes, a voltage higher than a threshold voltage required for arranging the molecules of the liquid crystal in the direction perpendicular the surfaces of the electrodes is applied to a region (selected point) at which both a scanning electrode and a signal electrode are selected and no voltage is applied to a region (non-selected point) at which neither a scanning electrode nor a signal electrode is selected. As a result, the molecules of the liquid crystal are maintained in a stable state in which they are in parallel with the surfaces of the electrodes. When linear polarizers are disposed upon the upper and lower surfaces of a liquid crystal cell or device of the type described in cross nicol relationship, a selected point prevents the transmission of light while a non-selected point permits the transmission of light, whereby a display or picture is formed. However, in the case of a liquid crystal device with a matrix of electrodes, a finite electric field is applied to a region (the so-called "semi-selected or half-selected point") in which a scanning electrode is selected while a signal electrode is not selected or in which a scanning electrode is not selected while a signal electrode is selected. When the difference between a voltage applied to a selected point and a voltage applied to a half-selected point is sufficiently large, and if a threshold voltage at which the molecules of a liquid crystal are oriented in the direction perpendicular to an electric field applied is between the above described voltages, the correct operation of a display element can be ensured. However, when the number (N) of scanning lines is increased, a time period (duty ratio) during which one selected point is subjected to an effective electric field during the time when one frame is scanned is decreased at a ratio of $1/N$. As a consequence, in the case of repetitive scanning, the greater the number of scanning lines, the smaller the effective voltage difference between a selected point and a non-selected point becomes. As a result, the problems of reduction in contrast of a picture and of crosstalk are unavoidable. These essentially unavoidable problems result when a driving method (that is, a repetitive scanning method) in which a liquid crystal which is not bistable (that is, a liquid crystal in which the molecules assume a stable state in which they are oriented in the horizontal direction relative to the surfaces of the electrodes and are oriented in the vertical direction only when an effective electric field is applied) is driven by utilizing a time storage effect. In order to overcome these problems, there have been proposed a voltage averaging method, a two-frequency driving, a multiple matrix method and so on. However, neither of these is satisfactory in solving the above described problems. Therefore, it is impossible at present to provide a display device with a large picture size and with a high density of picture elements because it is impossible to increase the number of scanning lines.

Meanwhile, a laser beam printer (LBP) in which the electrical signals representing a pattern are applied in the form of a light pattern to an electro-photographic sensitive member is most excellent as a means for obtaining a hard copy in response to the electrical input signals in the field of printers from the viewpoint of the density of picture elements and the copying speed. However, the laser beam printers have some defects as follows:

1. First, they are large in size as a printer.
2. Second, they have moving parts such as a polygon scanner which are driven at high speeds so that noise is produced and these moving parts must be machined with a higher degree of dimensional accuracy.

In order to overcome the above and other problems, there has been proposed the use of a liquid crystal shutter array which is a means for converting electrical signals into optical signals. However, in the case of generating the picture-element signals with a liquid crystal shutter array, 2000 signal generators are needed in order to write the picture-element signals in a length of 200 mm at a rate of 10 dots per millimeter. Furthermore it is required to apply independent signals to these signal generators through respective lead wires. For these reasons, it has been difficult to provide a liquid crystal shutter array.

In order to overcome the above and other problems another attempt is made to apply one line of image signals in a time sharing manner by signal generators divided into a plurality of times. This method makes it possible to use a common electrode in order to apply a signal to a plurality of signal generators. As a result, the number of conductors can be reduced remarkably. However, when a liquid crystal lacking bistability is used and when the number (N) of lines is increased, the ON time of a signal is substantially reduced to 1/N. As a result, there arise the problems that the quantity of light incident on a photosensitive member is decreased and that crosstalk occurs.

SUMMARY OF THE INVENTION

An object of the present invention is therefore to provide a novel method for driving an optical modulation device, especially a ferroelectric liquid crystal device, which can substantially overcome the above problems encountered in the prior art liquid crystal display devices and liquid crystal optical shutters.

Another object of the present invention is to provide a method for driving an optical modulation device, especially a ferroelectric liquid crystal device, with a fast response.

A further object of the present invention is to provide a method for driving an optical modulation device especially a ferroelectric liquid crystal device, with a high density of picture elements.

The above and other objects of the present invention can be attained by a method for driving an optical modulation device of the type in which a group of scanning electrodes and a group of signal electrodes are so arranged that picture elements are defined at the intersections, respectively, between the scanning and signal electrodes, and bistable optical modulation materials which are made to assume either of two stable states in response to an electric field applied are interposed between the group of scanning electrodes and the group of signal electrodes, having a first phase in which a bistable optical modulation material corresponding to a picture element on an N-th scanning electrode is made to assume a first stable state, a second phase in which a writing signal is applied to the group of signal electrodes in synchronism with a scanning signal applied to the N-th scanning electrode and a third phase in which a bistable optical modulation material corresponding to a picture element on an N+1-th scanning electrode is made to assume a first stable state or by a method for driving an optical modulation device of the type having a group of scanning electrodes, a group of signal electrodes and bistable optical modulation materials which are made to assume either of two stable states in response to an electric field applied and which are interposed between the group of scanning electrodes and the group of signal electrodes, having a first step in which a scanning signal is applied to the whole or some of the scanning electrodes while, in synchronism with the scanning signal, a signal is applied to the whole or some of the signal electrodes so that the optical modulation materials are made to assume a first stable state and a second step in which a scanning signal is applied to whole or some of the scanning electrodes while, in synchronism with the scanning signal, a signal is applied to the whole or some of the selected signal electrodes so that the bistable optical modulation materials are made to assume a second stable state.

DESCRIPTION OF THE PREFERRED EMBODIMENTS

Figure 1:
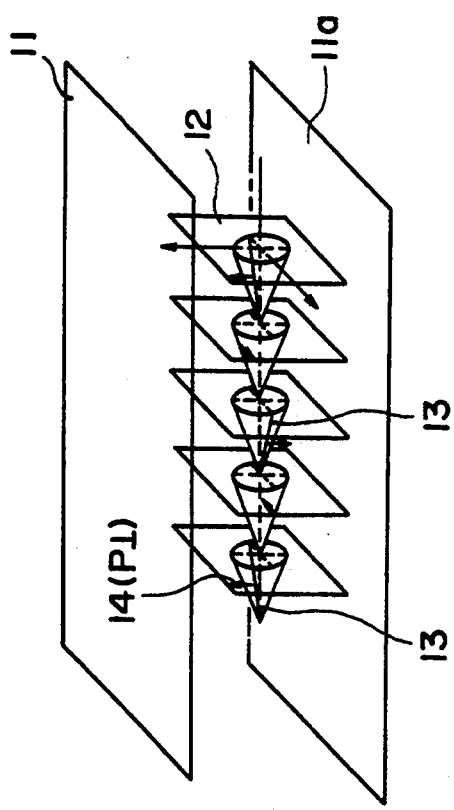
FIGS. 1 and 2 are schematic perspective views illustrating the basic operation principle of a liquid crystal device used in the present invention.

In one preferred embodiment of the present invention, an optical modulation device comprising a group of scanning electrodes which are sequentially and periodically selected in response to a scanning signal, a group of signal electrodes which are disposed in opposed relationship with the scanning electrodes and which are selected in response to a predetermined information signal, and a bistable optical modulation material interposed between the scanning and signal electrodes and adapted to assume either a first optically stable state or a second stable state depending on an electric field applied thereto, can be driven by lapplying to a selected scanning electrode an electrical signal which has a phase $T^0$ with a voltage for producing an electric field in one direction so that the optical modulation material is oriented to the first stable state regardless of an electrical signal applied to a signal electrode, and a phase T for writing an information signal with a voltage adapted to assist the optical modulation material to be set oriented to the second stable state in response to the electrical signal applied to the signal electrode or more preferably by applying an electric signal of the type described above in which the phase T comprises an information signal phase $T^1$ and an auxiliary signal phase $T^2$ in which an electrical signal with a voltage polarity opposite to that of an electrical signal applied in the phase $T^1$ to the group of signal electrodes in response to a predetermined information.

As an optical modulation material used in a driving method according to the present invention, a material which shows either a first optically stable state or a second optically stable state depending upon an electric field applied thereto, i.e., has bistability with respect to the applied electric field, particularly a liquid crystal having the above-mentioned property, may be used.

Preferable liquid crystals having bistability which can be used in the driving method according to the present invention are chiral smectic C (SmC*)- or H (SmH*)-phase liquid crystals having ferroelectricity. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals", "Solid State Physics" 16 (141), 1981 "Liquid Crystal", etc. Ferroelectric liquid crystals disclosed in these publications may be used in the present invention.

More particularly, examples of ferroelectric liquid crystal compound usable in the method according to the present invention include decyloxybenzylidene-p'-amino-2-methylbutyl cinnamate (HOBACPC), hexyloxybenzylidene-p'-amino-2-chloropropyl cinnamate (HOBACPC), 4-o-(2-methyl)-butylresorcilidene-4'-octylaniline (MBRA8), etc.

In addition to the SmC*- or SmH*-phase liquid crystals as described above, liquid crystals showing chiral smectic I phase (SmI*), J phase (SmJ*), G phase (SmG*), F phase (SmF*) or K phase (SmK*) may also be used in the present invention.

When a device is constituted using these materials, the device may be supported with a block of copper, etc., in which a heater is embedded in order to realize a temperature condition where the liquid crystal compounds assume a smectic phase.

Figure 2:
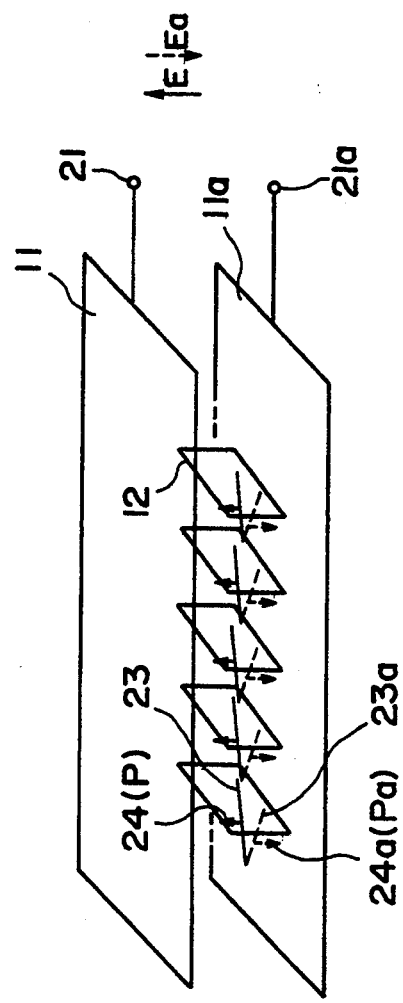

Referring to FIG. 1, there is schematically shown an example of a ferroelectric liquid crystal cell for explanation of the operation thereof. Reference numerals 11 and 11a denote base plates (glass plates) on which a transparent electrode of, e.g., $In_2O_3$, $SnO_2$, ITO (Indium-Tin Oxide), etc., is disposed, respectively. A liquid crystal of an SmC*- or SmH*-phase in which liquid crystal molecular layers 12 are oriented perpendicular to surfaces of the glass plates is hermetically disposed therebetween. A full line 13 shows liquid crystal molecules. Each liquid crystal molecule 13 has a dipole moment ($P\perp$) 14 in a direction perpendicular to the axis thereof. When a voltage higher than a certain threshold level is applied between electrodes formed on the base plates 11 and 11a, a helical structure of the liquid crystal molecule 13 is loosened a unwound to change the alignment direction of respective liquid crystal molecules 13 so that the dipole moments ($P\perp$) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., $1\mu$), the helical structure of the liquid crystal molecules is loosened even in the absence of an electric field whereby the dipole moment assumes either of the two states, i.e., P in an upper direction 24 or Pa in a lower direction 24a as shown in FIG. 2. When electric field E or Ea higher than a certain threshold level and different from each other in polarity as shown in FIG. 2 is applied to a cell having the above-mentioned characteristics, the dipole moment is directed either in the upper direction 24 or in the lower direction 24a depending on the vector of the electric field E or Ea. In correspondence with this, the liquid crystal molecules are oriented in either of a first stable state 23 and a second stable state 23a.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 2. When the electric field E is applied to the liquid crystal molecules, they are oriented in the first stable state 23. This state is kept stable even if the electric field is removed. On the other hand, when the electric field Ea of which direction is opposite to that of the electric field E is applied thereto, the liquid crystal molecules are oriented to the second stable state 23a, whereby the directions of molecules are changed. This state is also kept stable even if the electric field is removed. Further, as long as the magnitude of the electric field E being applied is not above a certain threshold value, the liquid crystal molecules are placed in the respective orientation states. In order to effectively realize high response speed and bistability, it is preferable that the thickness of the cell is as thin as possible and generally 0.5 to $20\mu$, particularly 1 to $5\mu$. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

A preferred embodiment of the driving method according to the present invention is explained with reference to FIG. 3.

Figure 3:
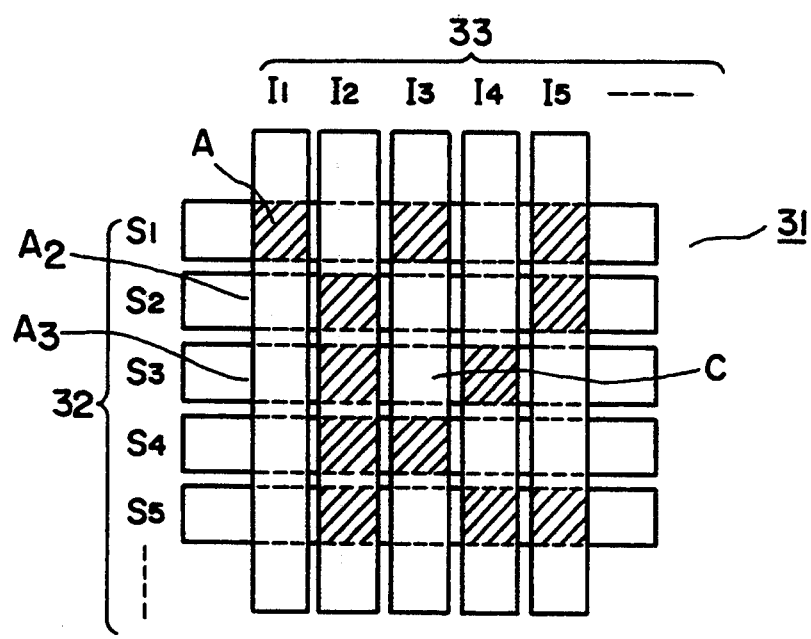
FIG. 3 is a schematic plan view of a matrix of electrodes used in the driving method in accordance with the present invention.
Figure 4:
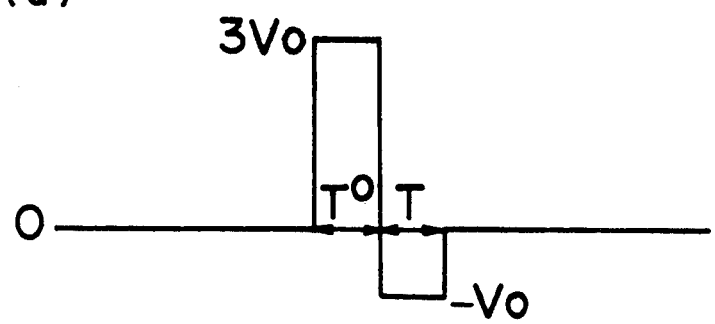
FIGS. 4(a)-(f) are views showing waveforms of electrical signals applied to the electrodes.
Figure 4:
Figure 4:
Figure 4D:
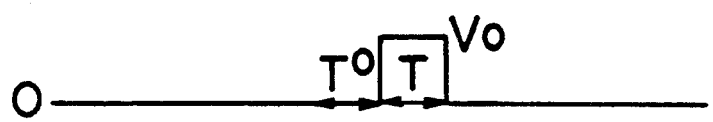
Figure 4E:
Figure 4F:
Figure 5:
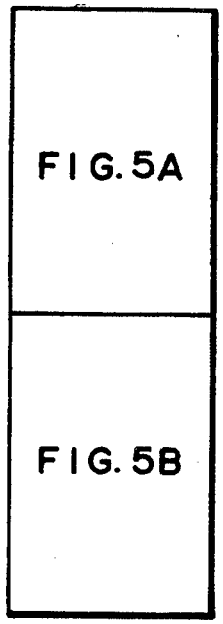
FIG. 5 (combination of FIGS. 5A and 5B) shows the waveforms of voltages applied in time series.
Figure 5A:
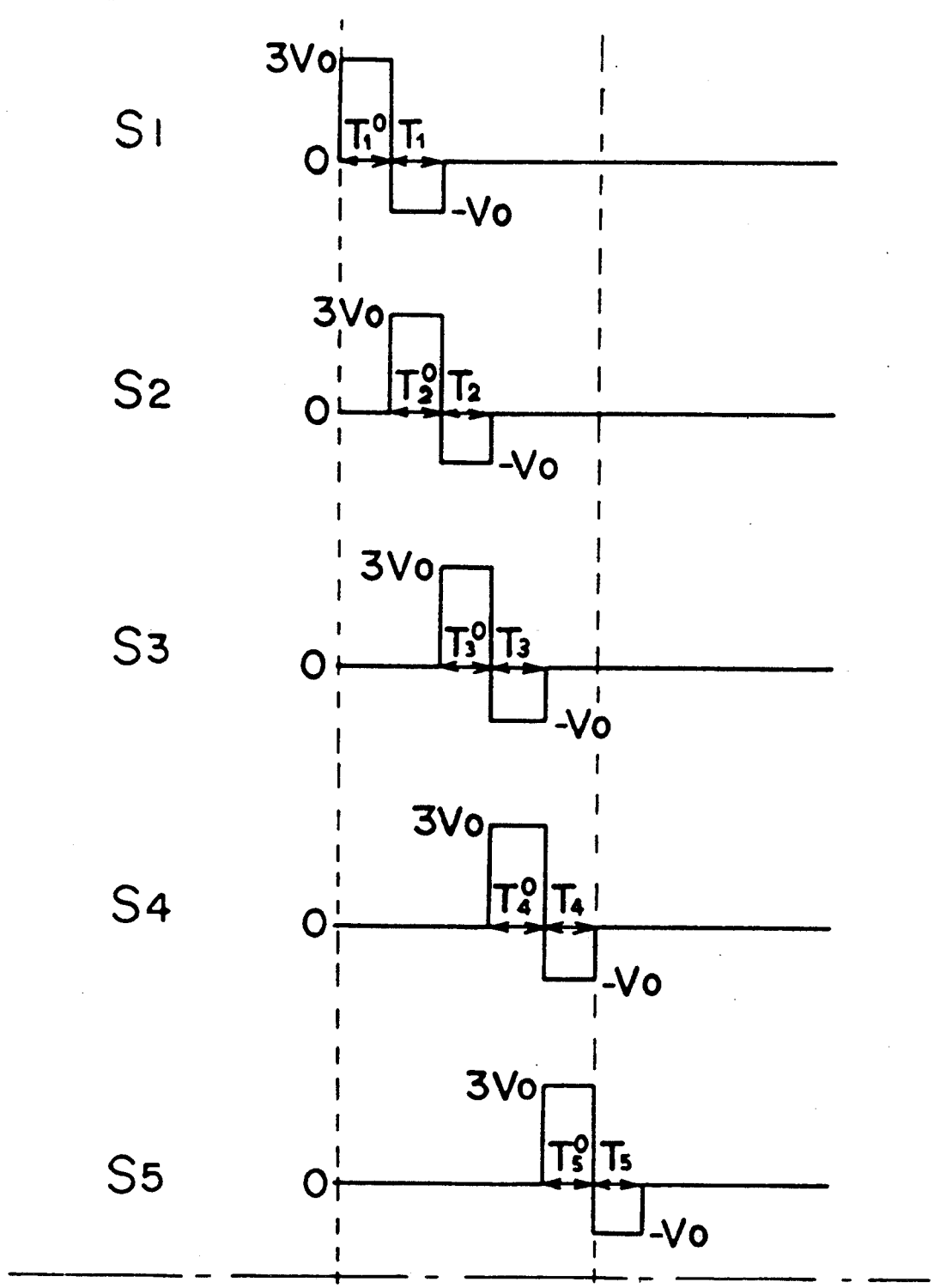
Figure 5B:
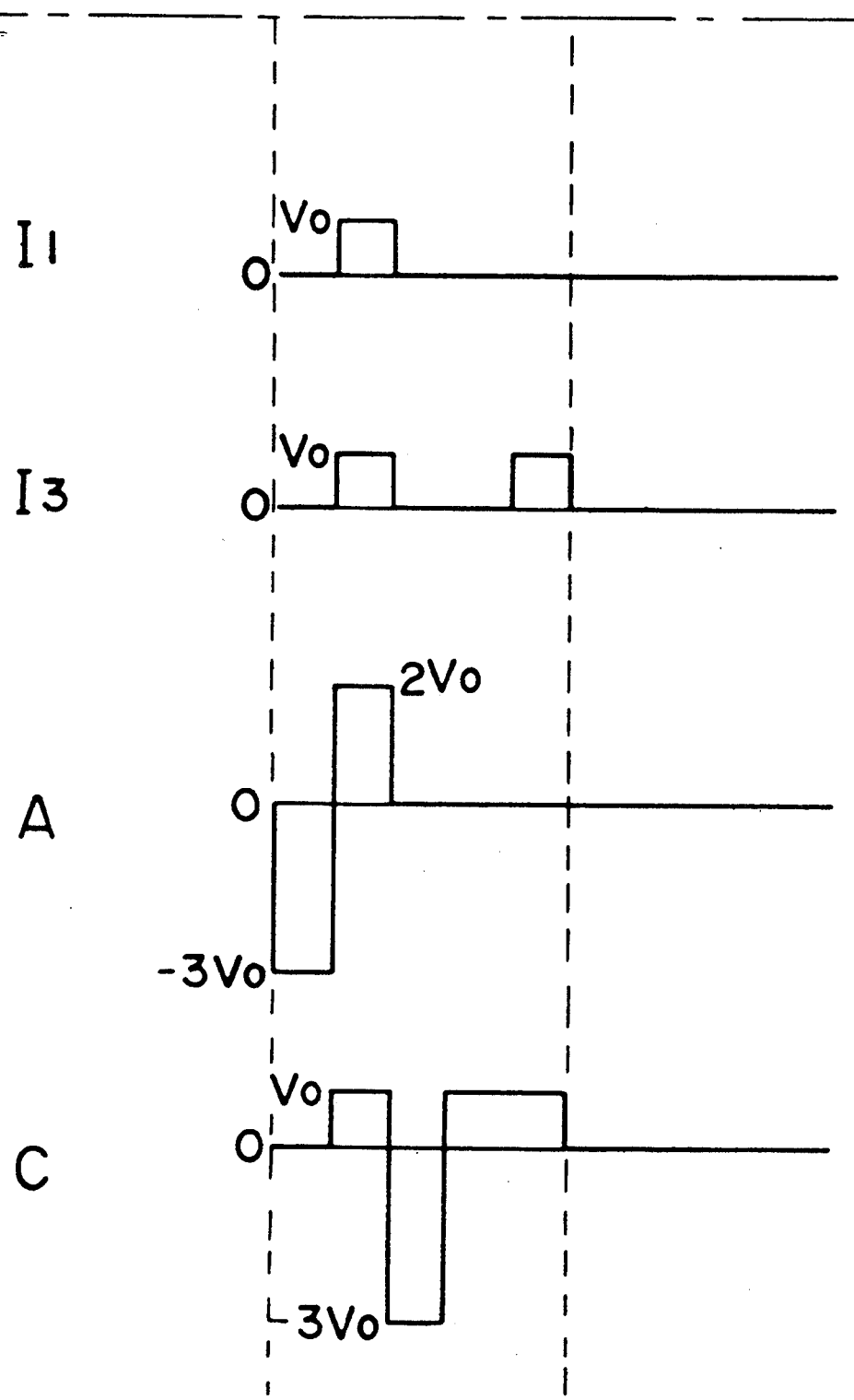
Figure 6A:
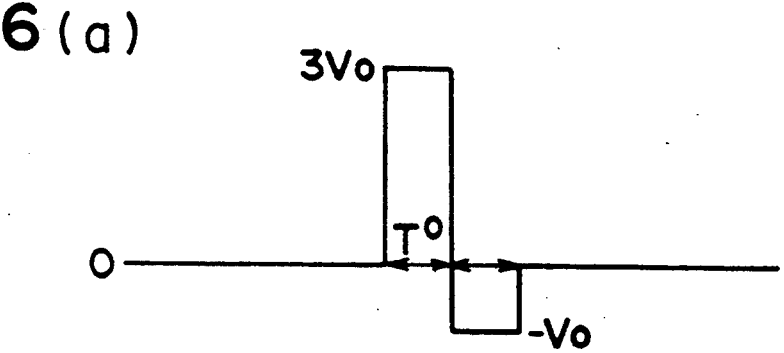
FIGS. 6(a)-(f) show the waveforms of electrical signals applied to the electrodes in an another embodiment of the present invention.
Figure 6B:
Figure 6C:
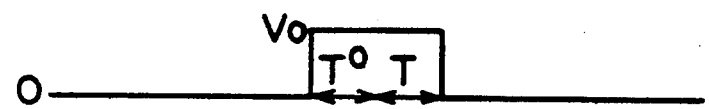
Figure 6D:
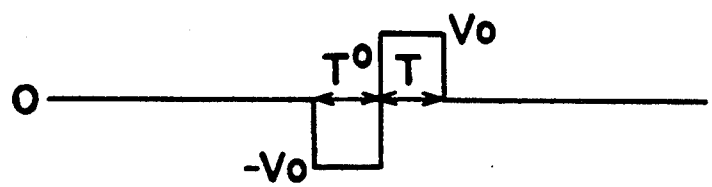
Figure 6E:
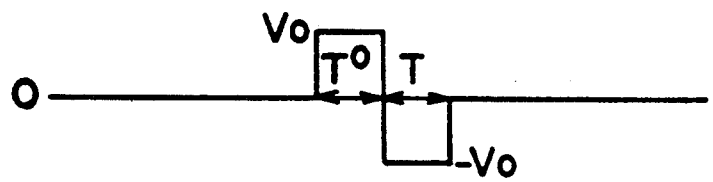
Figure 6F:
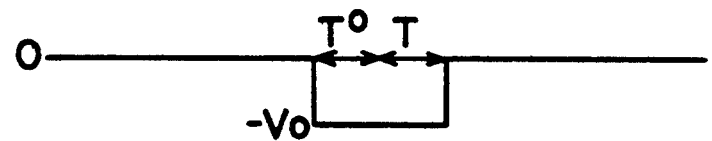

FIG. 3 is a schematic view of a cell 31 with a matrix of electrodes comprising scanning electrodes 32 and signal electrodes 33, and a ferro-electric liquid crystal interposed therebetween. For the sake of better understanding of the present invention, a simple case in which a picture element becomes black or white in response to a binary signal will be described. In FIG. 3, the hatched picture elements represent "black" while the white picture elements, "white". FIG. 4(a) shows an electric signal applied to a selected scanning electrode; FIG. 4(b) shows an electrical signal applied to the other scanning electrodes (non-selected scanning electrode); and FIGS. 4(c) and (d) respectively show electrical signals which are applied to a selected signal electrode (which represents "black"). More particularly, FIG. 4(c) shows an electrical signal applied to a selected signal electrode when the preceding electrical signal has represented "black", while FIG. 4(d) shows an electrical signal applied to a selected signal electrode when the preceding electrical signal has represented "white". FIGS. 4(e) and (f) show electrical signals which are applied to the signal electrodes which are not selected (and which represent "white"). More particularly, FIG. 4(e) shows an electrical signal applied to the non-selected signal electrodes when the preceding electrical signal has represented "black" while FIG. 4(f) shows an electrical signal applied to the non-selected signal electrodes when the preceding electrical signal has represented "white". In a phase $T^0$, all the picture elements on one scanning electrode once become "white"; and in a phase T, an information signal is written. In this embodiment, $T^0 = T = \Delta t$. FIG. 5 (combination of FIGS. 5A and 5B) shows the driving waveforms when the pattern as shown in FIG. 3 is displayed in response to the electrical signals as shown in FIG. 4. In FIG. 5, $S_1$–$S_5$ represent the signals applied to the scanning electrodes; $I_1$ and $I_3$, the signals applied to the signal electrodes $I_1$ and $I_3$, respectively; and A and C, the waveforms of voltages applied to the picture elements $A_1$ and C, respectively, shown in FIG. 3. A threshold voltage when it is applied for a time period of $\Delta t$ in order to drive a bistable liquid crystal into a first stable state (in which a picture element becomes "white") is represented by $-Vth_2$, while a threshold voltage when it is applied for a time period of $\Delta t$ in order to drive the bistable liquid crystal into a second stable state (in which a picture element becomes "black") is represented by $Vth_1$. Then, the value of $V_0$ is so selected that the following relations may be satisfied:

$$V_0 < Vth_1 > V_0,$$

and $$-2V_0 < -Vth_2 < -V_0.$$

As is clear from FIG. 5, all the picture elements on one scanning electrode are caused to become "white" once and thereafter "black" or "white" is selected in response to information. In the case of a picture element which represents "black", the reversal from "white" to "black" occurs, whereby the information is written. When the writing of information into the picture elements on one scanning electrode is being carried out within a predetermined phase (time period), the operation for causing all the picture elements on the next scanning electrode to become "white" is simultaneously carried out. Therefore, the operation for writing information into all the picture elements in one frame by scanning can be accomplished at a very high speed.

Figure 7:
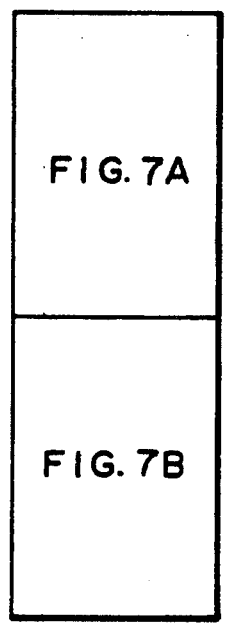
FIG. 7 (combination of FIGS. 7A and 7B) shows the waveforms of voltages applied in time series in said another embodiment of the present invention.

Another embodiment of the driving method in accordance with the present invention is shown in FIGS. 6 and 7. FIG. 6(a) shows an electric signal applied to a selected scanning electrode; and FIG. 6(b) shows an electric signal applied to the scanning electrodes which are not selected. FIGS. 6(c)–(f) show electrical signals applied to the signal electrodes. FIGS. 6(c) and (e) show the information signals applied when the preceding signal has represented "black", while FIGS. 6(d) and (f) show the information signals applied when the preceding signal has represented "white". In FIGS. 6(c) and (d), an information signal $V_0$ for representing "black" is shown as being applied in a phase T, while an information signal $-V_0$ for representing "white" is shown as being applied in the phase T in FIGS. 6(e) and (f).

Figure 7A:
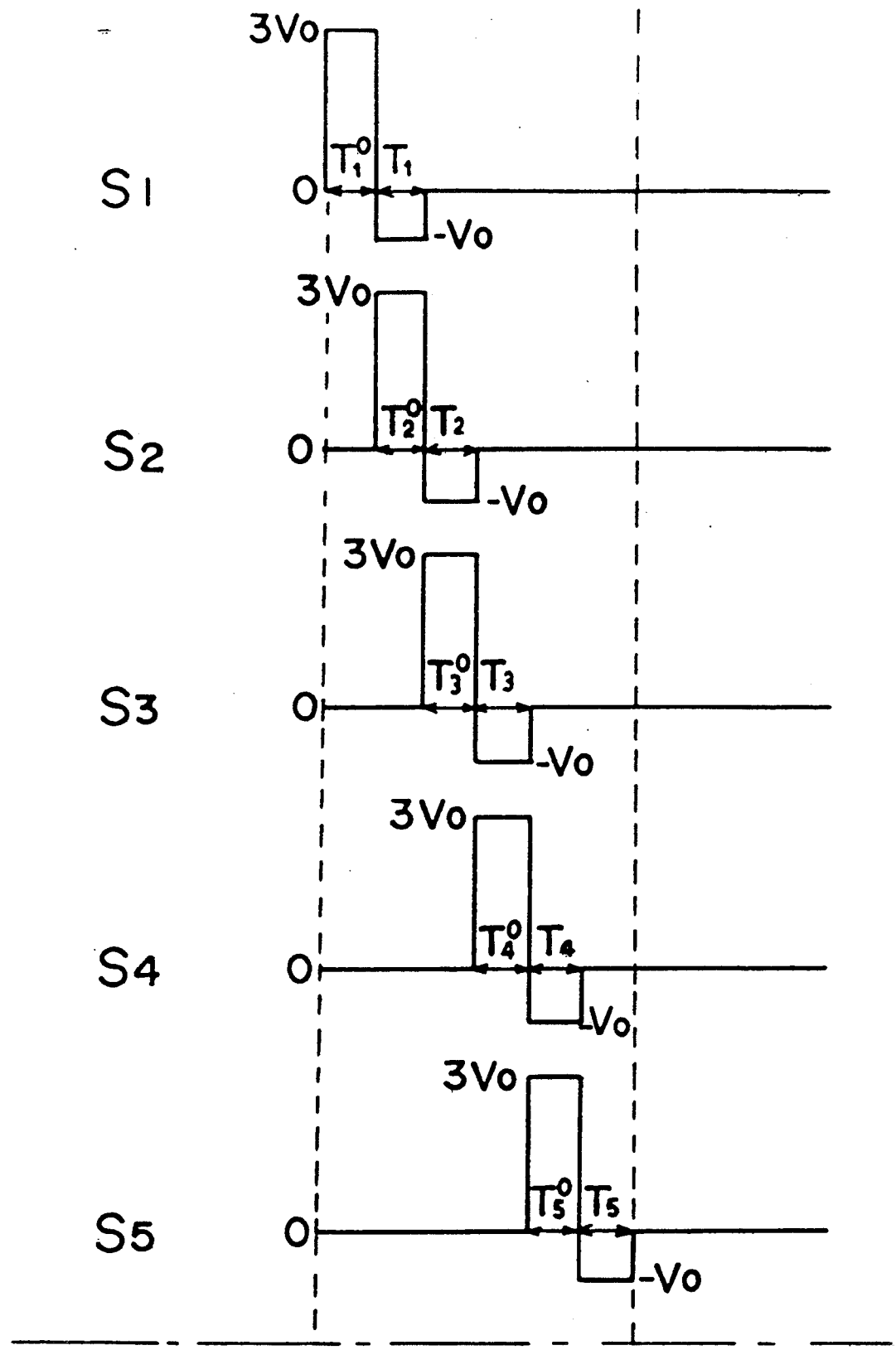
Figure 7B:
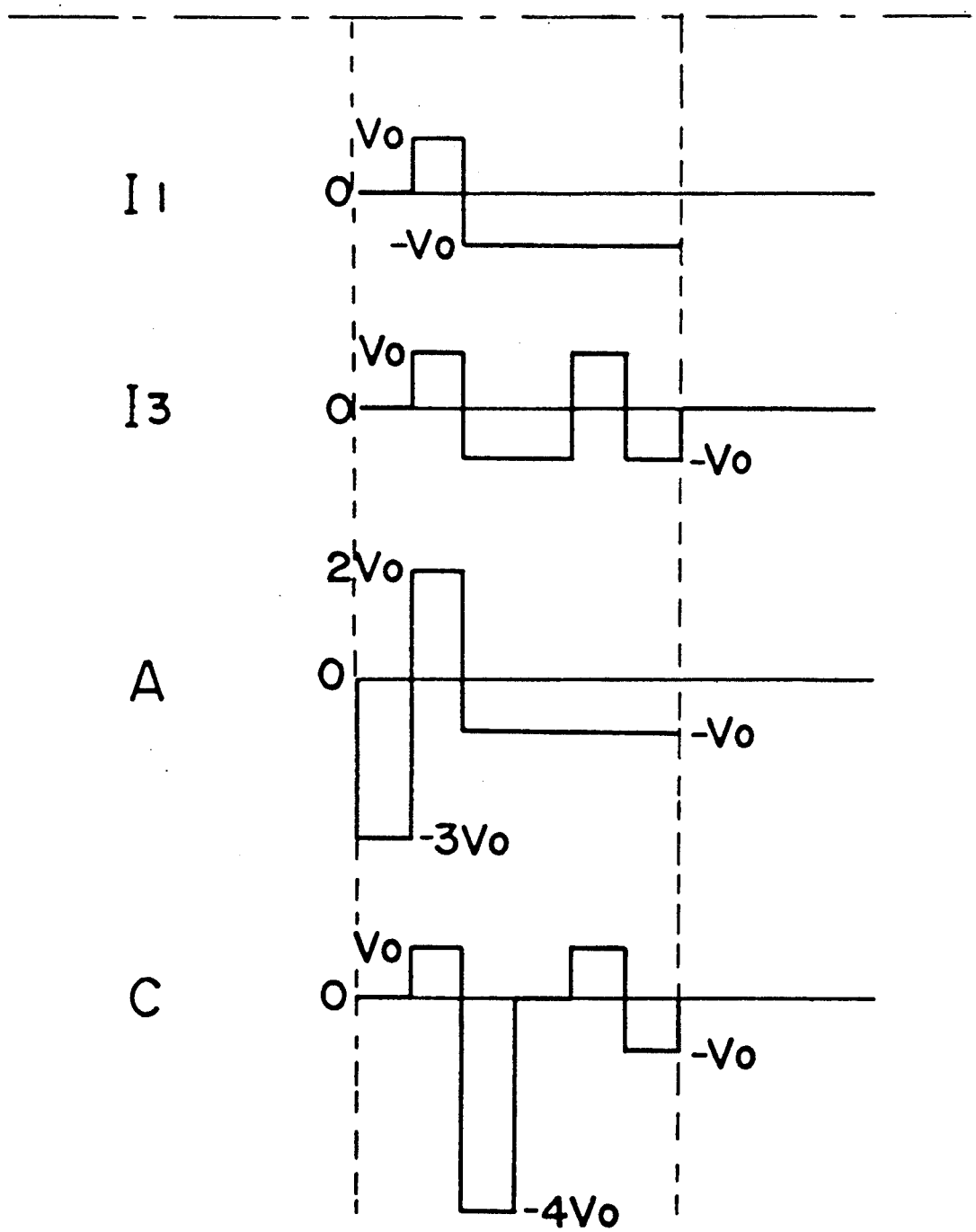

FIG. 7 (combination of FIGS. 7A and 7B) shows the driving waveforms when the pattern as shown in FIG. 3 is displayed. In FIG. 7, $S_1$–$S_5$ represent the signals applied to the scanning electrodes; $I_1$ and $I_3$ represent the signals applied to the signal electrodes $I_1$ and $I_3$, respectively; and A and C represent the waveforms of the voltages applied to the picture elements $A_1$ and C, respectively, of the pattern shown in FIG. 3.

Microscopic mechanism of switching due to electric field of a ferroelectric liquid crystal having bistability has not been fully clarified. Generally speaking, however, the ferroelectric liquid crystal can retain its stable state semi-permanently, if it has been switched or oriented to the stable state by application of a strong electric field for a predetermined time and is left standing under absolutely no electric field. However, when a reverse polarity of an electric field AC voltage is applied to the liquid crystal for a long period of time, even if the electric field is such a weak field (corresponding to a voltage below $V_{th}$ in the previous example) that the stable state of the liquid crystal is not switched in a predetermined time for writing, the liquid crystal can change its stable state to the other one, whereby correct display or modulation of information cannot be accomplished. We have recognized that the liability of such switching or reversal of oriented states under a long term application of a weak electric field is affected by the material and roughness of a base plate contacting the liquid crystal and the kind of the liquid crystal, but have not clarified the effects quantitatively. We have confirmed a tendency that a monoaxial treatment of the base plate such as rubbing or oblique or tilt vapor deposition of SiO, etc., increases the liability of the above-mentioned reversal of oriented states. The tendency is manifested at a higher temperature compared to a lower temperature.

Anyway, in order to accomplish correct display or modulation of information, it is advisable that one direction of electric field is prevented from being applied to the liquid crystal for a long time.

In a preferred embodiment of the driving method in accordance with the present invention, therefore, there is provided an auxiliary signal phase $T^2$ in order to prevent the continuous application of an electric field in one direction as will be described in detail with reference to FIGS. 8 and 9 hereinafter.

Figure 8A:
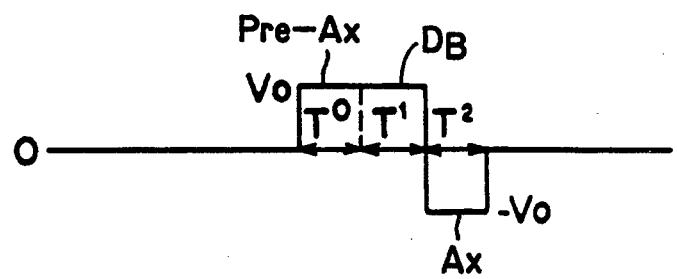
FIGS. 8A(a)-(f) show the waveforms of electrical signals applied to the electrodes in a further embodiment of the present invention.
Figure 8A:
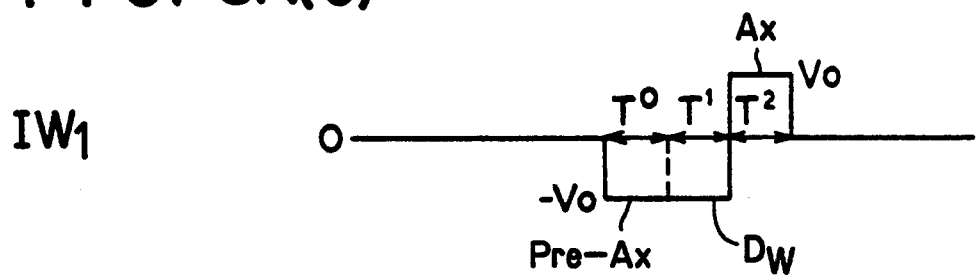
Figure 8A:
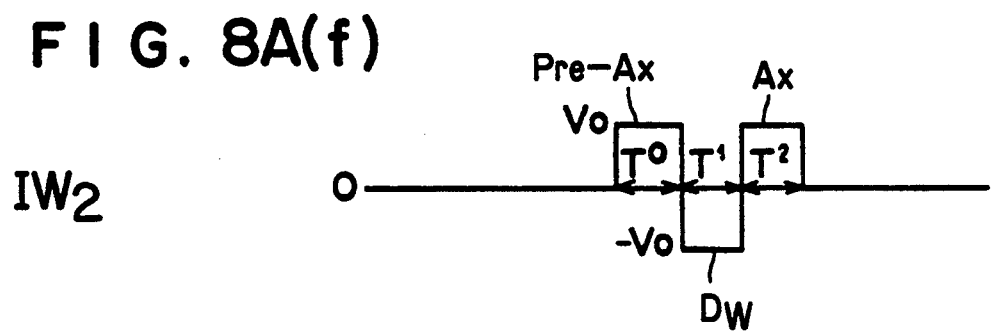

In FIGS. 8A(a)–8A(f) and 10A(c)–10A(f), $S_S$ refers to a scanning selection signal applied to a particular scanning electrode and $S_N$ to a scanning nonselection signal. $D_B$ is an information signal for writing "black" in a pixel on the particular scanning electrode and $D_W$ is an information signal for writing "white" in a pixel on the particular scanning electrode. Ax is an auxiliary signal accompanying the $D_B$ or $D_W$. Pre-Ax is an auxiliary signal applied during a scanning selection period for a scanning electrode which is selected prior to the particular scanning electrode. $IB_1$ and $IB_2$ are data signals for writing "black" in pixels inclusively showing Pre-Ax signals applied to the pixels subsequent to Pre-$D_B$ and Pre-$D_W$, respectively, applied during a preceding period for writing "black" and "white" in the pixels. $IW_1$ and $IW_2$ are data signals for writing "white" in pixels inclusively showing Pre-Ax signals applied to the pixels subsequent to Pre-D$_B$ and PRe-D$_W$, respectively, applied during a preceding period for writing "black" and "white" in the pixels. Pre-D$_B$ (not shown) is an information signal for writing "black" in the pixel concerned in the preceding period. Pre-D$_W$ (not shown) is an information signal for writing "white" in the pixels concerned in the preceding period.

FIG. 8(a) shows an electrical signal applied to a selected scanning electrode; and FIG. 8A(b), an electrical signal applied to the scanning electrodes which are not selected. As shown in FIGS. 8A(c)–(f), during a phase T$^2$, AC voltage signals with a polarity opposite to that of the information signal applied in the phase T$^1$ (corresponding to "black" in FIGS. 8A(c) and (d), and "white" in FIGS. 8A(e) and (f) are applied to a signal electrode. This will be described in more detail in conjunction with the display of the pattern as shown in FIG. 3. In the case of the driving method without the phase T$^2$, the picture element A$_2$ becomes "black" in response to the scanning of the scanning electrode S$_1$, but there arises a problem that the picture element A erratically becomes "white" because when the scanning electrodes S$_2$, S$_3$ and so on are successively scanned, the electrical signal of $-V_0$ is continuously applied to the signal electrode I$_1$ and hence to the picture element A. However, if an auxiliary signal phase T$^2$ is provided as described above, there arises no problem of crosstalk as is clear from the time serial signals shown in FIG. 8.

FIGS. 8A(c) and (e) show the electrical signals applied when the preceding signal has represented "black", while FIGS. 8A(d) and (f) show the electrical signals applied when the preceding signal has represented "white".

Figure 8B:
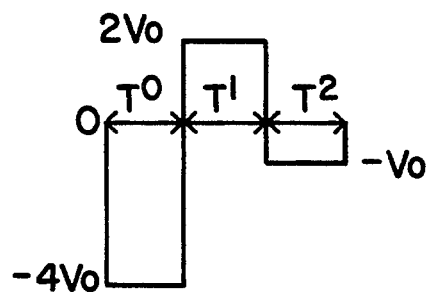
FIGS. 8B(a)-(d) show the waveforms applied to pixels on the particular scanning electrode to which a selection signal is applied.
Figure 8B:
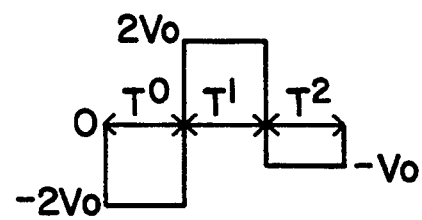
Figure 8B:
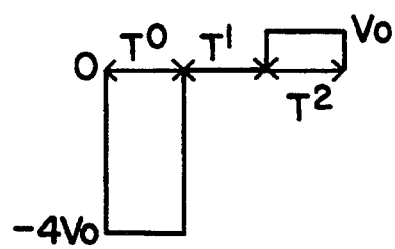
Figure 8B:
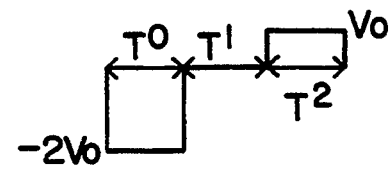

FIGS. 8B(a)–(d) show the waveforms applied to pixels on the particular scanning electrode to which a selection signal is applied. For example, FIG. 8B(a) illustrates signals S$_S$ and IB$_1$ applied to a particular pixel.

Figure 9:
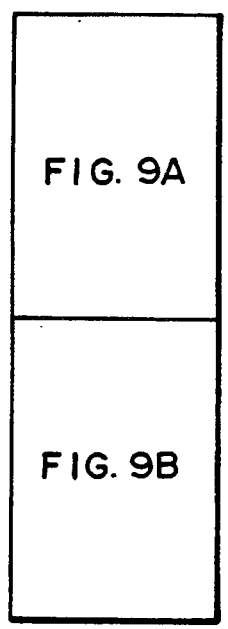
FIG. 9 (combination of FIGS. 9A and 9B) shows the waveforms of voltages applied in time series in said further embodiment of the present invention.
Figure 9A:
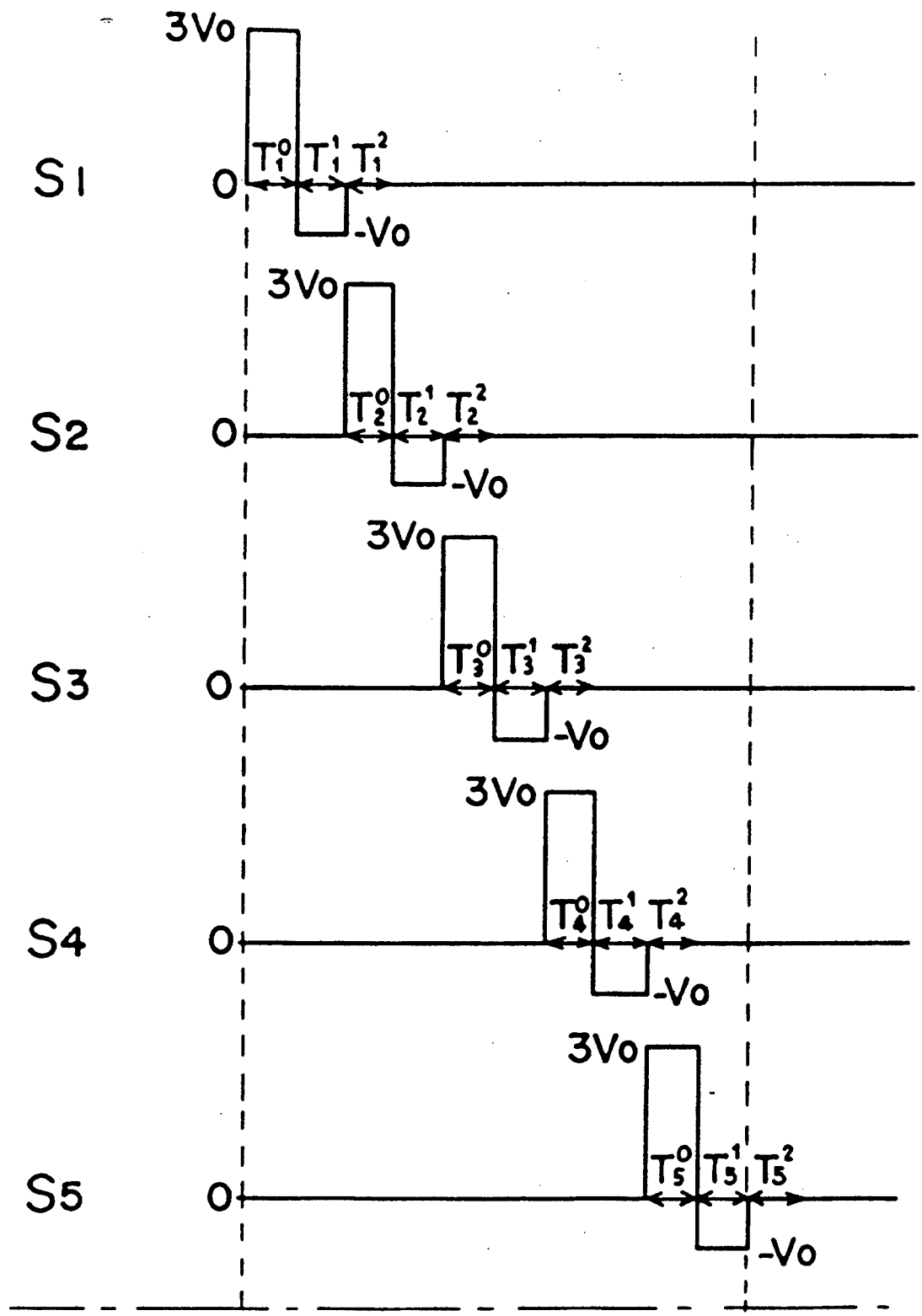
Figure 9B:
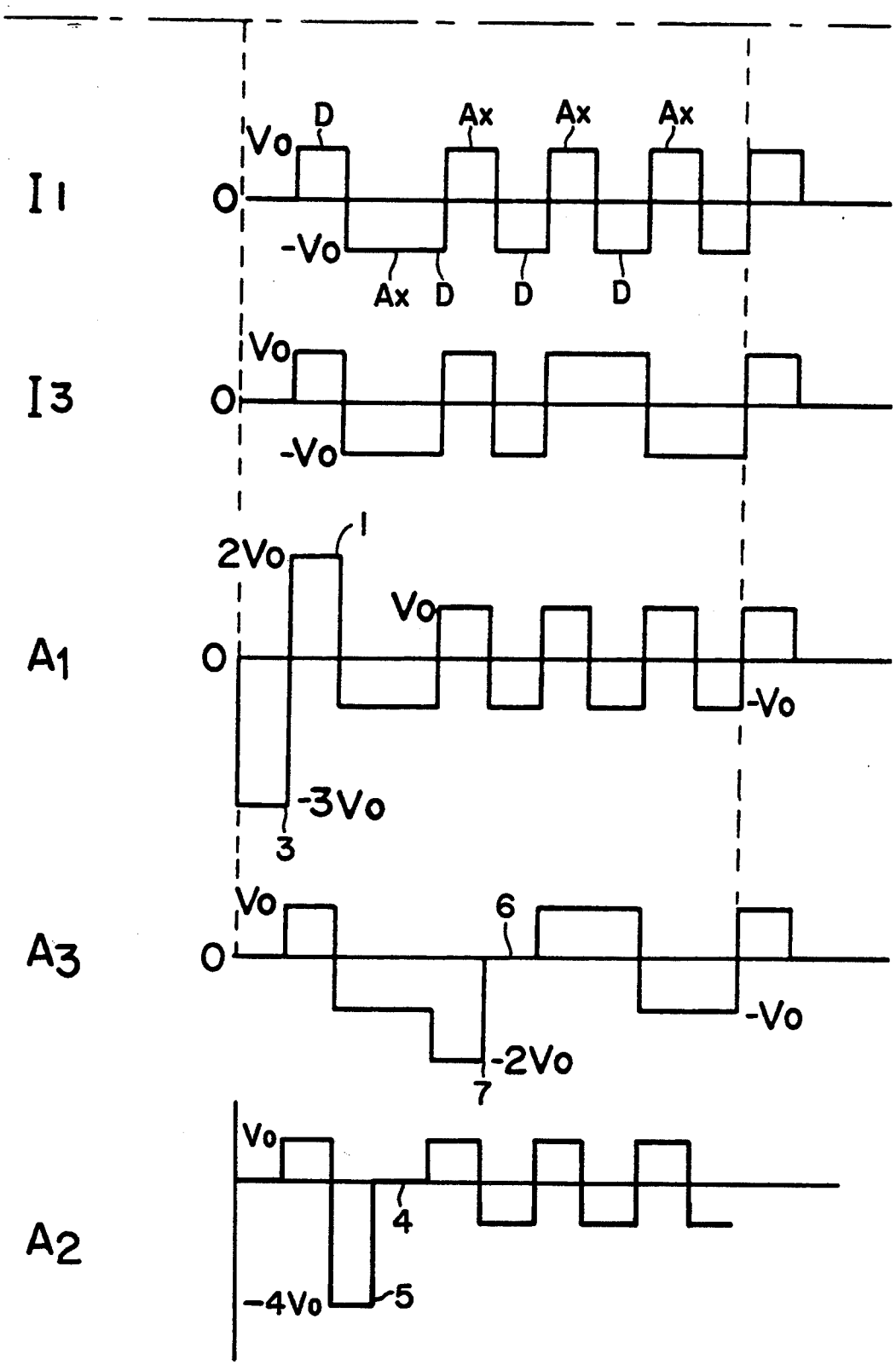

FIG. 9 (combination of FIGS. 9A and 9B) shows the driving waveforms used to display the pattern as shown in FIG. 3. In FIG. 9, S$_1$–S$_5$ represent the signals applied to the scanning electrodes; I$_1$ and I$_3$ represent the signals applied to the signal electrodes I$_1$ and I$_3$, respectively; and A$_1$ and C represent the waveforms of the voltages applied to the picture elements A$_1$ and C, respectively, as shown in FIG. 3.

The following notes refer to FIG. 9:
1. A pixel A$_1$ is selected into "black".
2. AC voltage not changing the selected black state.
3. The pixel A$_1$ is erased into "white" when the one-polarity voltage is applied to S$_1$. At this time, the pixels on S$_1$ are non-selectively supplied with a voltage of $-3V_0$ to be simultaneously erased into "white".
4. A pixel A$_2$ is selected in "white".
5. The pixel A$_2$ on a subsequently selected scanning electrode S$_2$, i.e., during the period of selecting the display states of the pixels on S$_1$. At this time, the pixels on S$_2$ are supplied with a voltage of $-2V_0$ or $-4V_0$ (varying depending on whether the auxiliary signal is $+V_0$ or $-V_0$) respectively exceeding the threshold V$_{th}$ to be simultaneously erased into "white".
6. A pixel A$_3$ is selected in white.
7. The pixels on S$_3$ including A$^3$ are simultaneously erased into "white".

A further embodiment of the driving method in accordance with the present invention will be described with reference to FIGS. 10 and 11. In this embodiment, V$_0$, Vth$_1$ and Vth$_2$ are so selected that the following relations may be satisfied:

$$V_0 < Vth_1 < 3V_0,$$

and $$-3V_0 < -Vth_2 < -V_0.$$

Figure 10A:
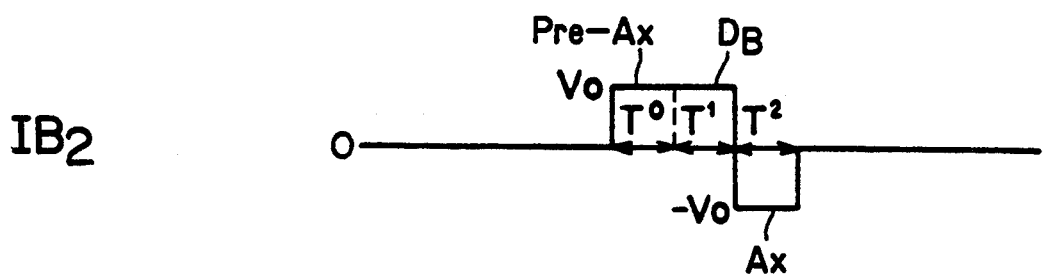
FIGS. 10A(a)-(f) show the waveforms of electrical signals applied to the electrodes in yet a further embodiment of the present invention.
Figure 10A:
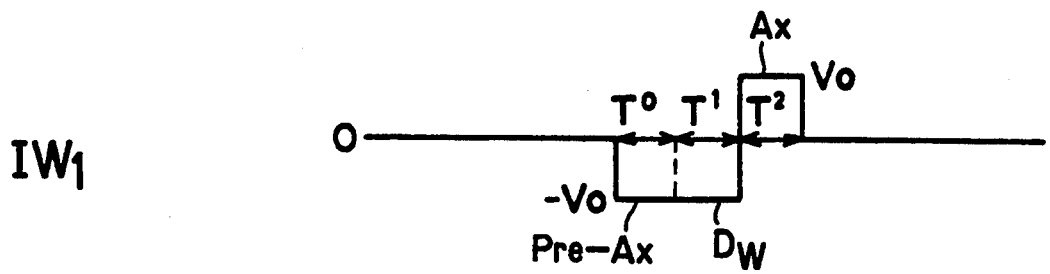
Figure 10A:
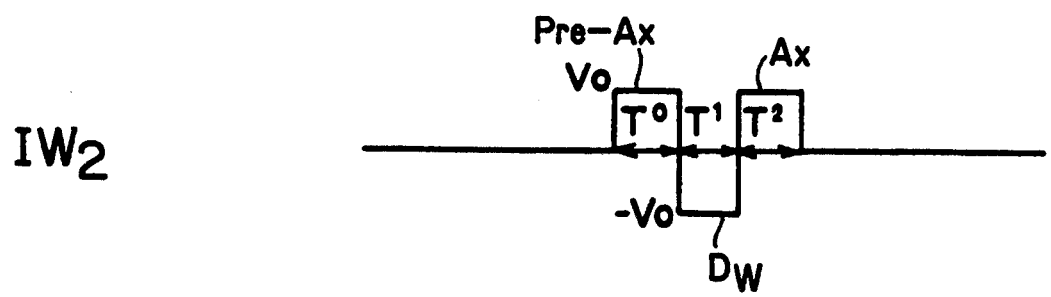
Figure 10B:
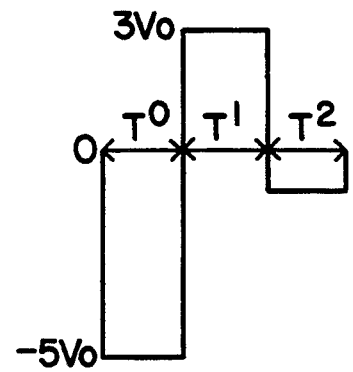
FIGS. 10B(a)-(d) show the waveforms applied to pixels on the particular scanning electrode to which a selection signal is applied.
Figure 10B:
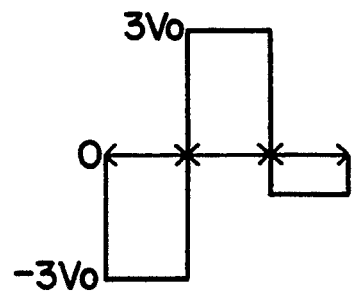
Figure 10B:
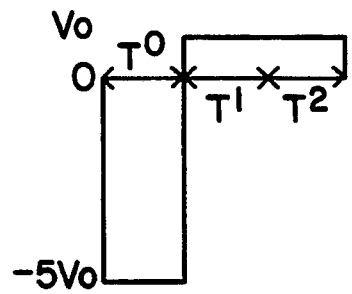
Figure 10B:
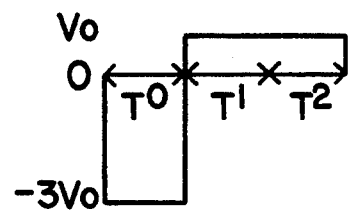
Figure 11A:
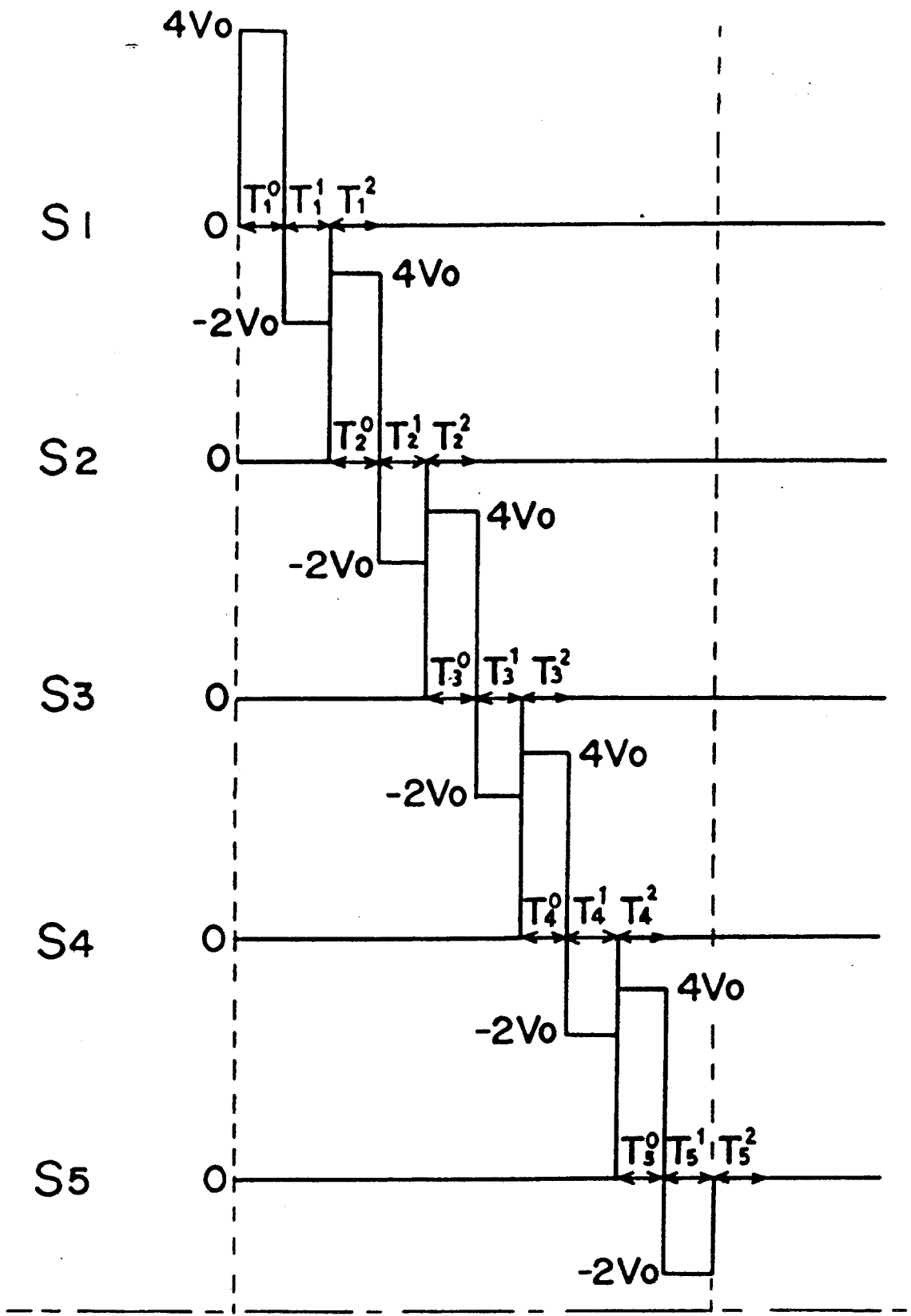
Figure 11B:
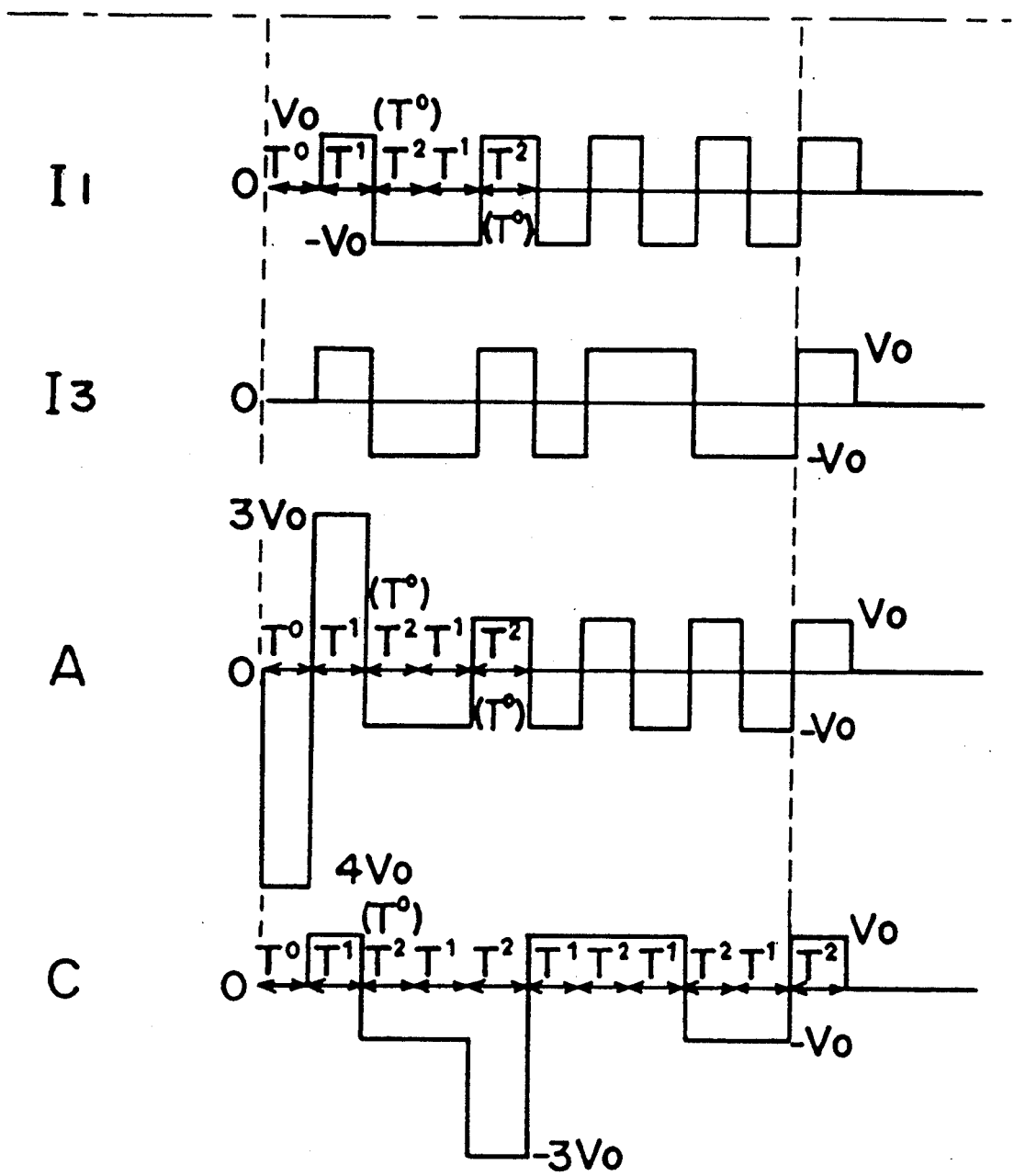

FIG. 10A(a) shows the electrical signal applied to a selected scanning electrode; and FIG. 10(b), the electrical signal applied to the scanning electrodes which are not selected.

Meanwhile, an optimum time interval of the auxiliary signal phase T$^2$ is dependent upon the magnitude of a voltage applied to a signal electrode. When a voltage with a polarity opposite to that of a voltage applied during the information signal phase T$^1$ is applied, it is preferred in general that when a higher voltage is applied, the time period of the phase T$^2$ is shorter while when a lower voltage is applied, the time period is longer. However, when the time period is long, it takes a long time to scan the whole picture. As a result, it is preferable to set T$^2$≦T$^1$.

FIGS. 10A(c)–(f) show the information signals applied to the signal electrodes. FIGS. 10A(c) and (e) show the information signals applied when the preceding signal has represented "black", while FIGS. 10A(d) and (f) show the information signals applied when the preceding signal has represented "white". In FIGS. 10A(c) and (d), an information signal V$_0$ for representing "black" is applied during the phase T$^1$, and, in FIGS. 10(e) and (f) an information signal V$_0$ for representing "white" is applied during the phase T$^1$.

FIGS. 10B(a)–(d) show the waveforms applied to pixels on the particular scanning electrode to which a selection signal is applied. For example FIG. 10B(a) illustrates signals S$_S$ and IB$_1$ applied to a particular pixel.

Figure 11:
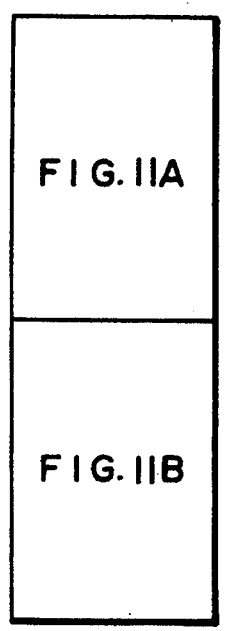
FIG. 11 (combination of FIGS. 11A and 11B) shows the waveforms of voltages applied in time series in a further embodiment of the present invention.

FIG. 11 shows the driving waveforms used when the pattern as shown in FIG. 3 is displayed. In FIG. 11, S$_1$–S$_5$ represent the signals applied to the scanning electrodes; I$_1$ and I$_3$, the signals applied to the electrodes I$_1$ and I$_3$, respectively; and A and C, the waveforms of the voltages applied to the picture elements A and C, respectively, as shown in FIG. 3.

The present invention will now be explained with reference to working examples.

EXAMPLE 1

Figure 12:
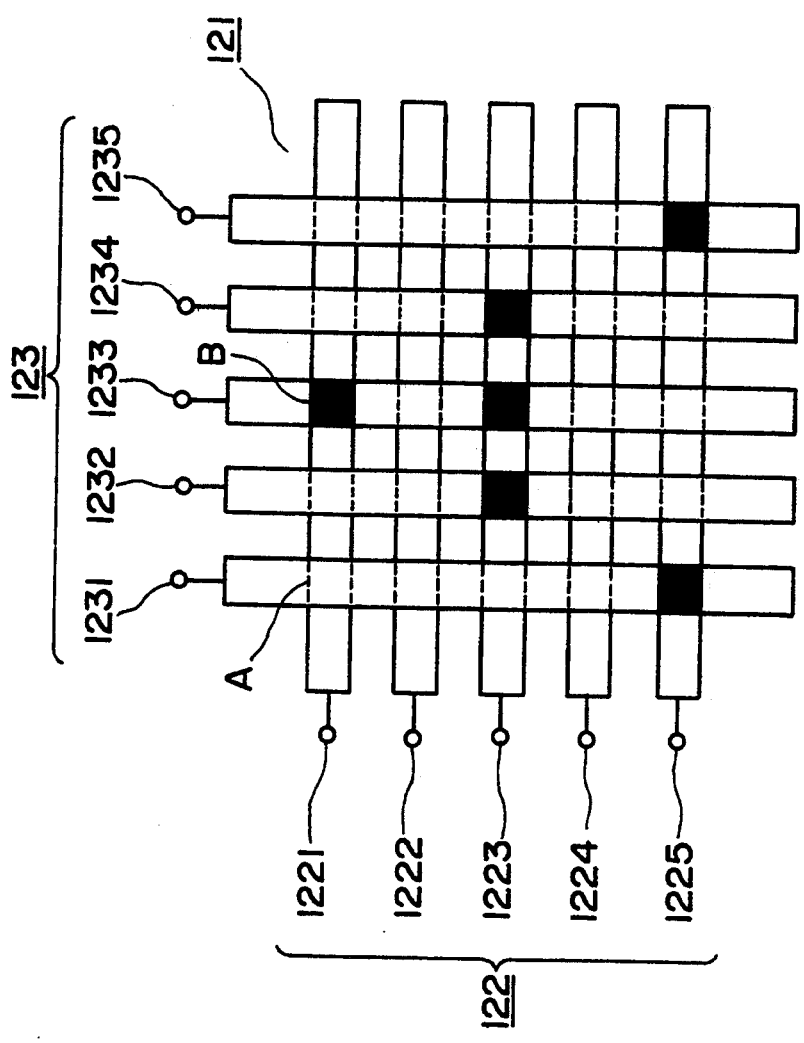
FIG. 12 is a schematic plan view of a matrix of electrodes of a liquid crystal device driven by the method of the present invention.

A pair of glass plates whose transparent conductor films (ITO) were so patterned as to define a 500×5000 matrix were coated with a polyimide film of about 300 A in thickness by a spin-coating process. Thereafter the glass plates were subjected to a rubbing process with a roller about which a suede cloth was wound and then were joined together in such a way that the rubbing directions were aligned, whereby a cell was provided. The cell gap was about 1.2μ. DOBAMBC, which is a ferroelectric liquid crystal, was filled into the cell and was gradually cooled from the heated and molten state, whereby a uniform monodomain in the SmC state was obtained. The cell temperature was maintained at 70° C. and V$_0$ was set to 10 V while the phases T$^0$=T$^1$=T$^2$=Δt were set to 50 microseconds in accordance with the driving method described above with reference to FIG. 10. Extremely high-quality pictures could be obtained by the line-by-line scanning Yet another embodiment of the driving method in accordance with the present invention will be described with reference to FIG. 12 showing schematically a cell 121 with a matrix of electrodes and a ferroelectric liquid crystal (not shown) sandwiched between the electrodes. The cell 121 has a group of scanning electrodes 122 and a group of signal electrodes 123.

Figure 13A:
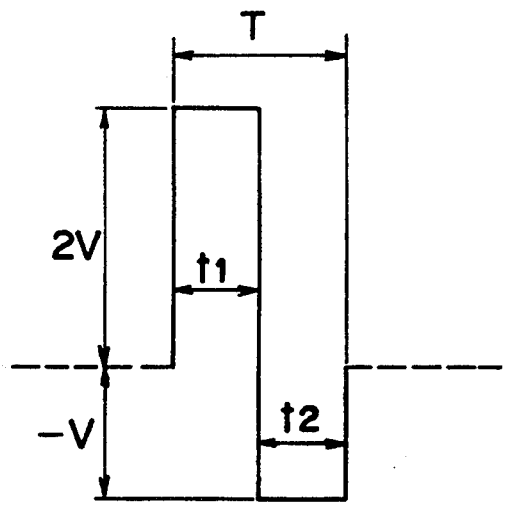
FIGS. 13(a)-(d) show the waveforms of electrical signals.
Figure 13B:
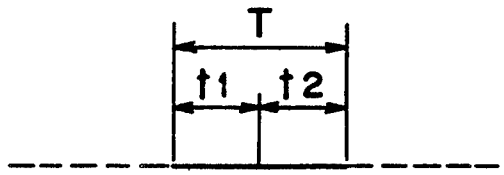
Figure 13C:
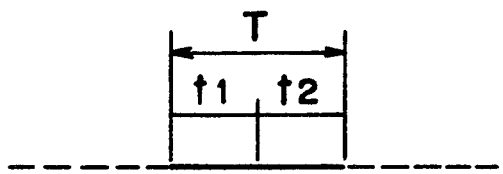
Figure 13D:
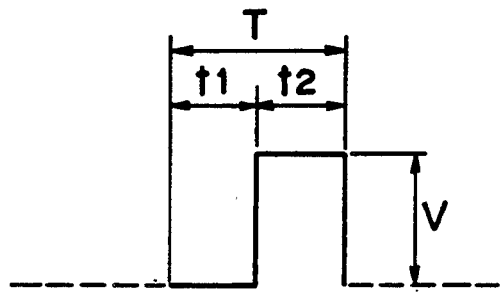

FIG. 13(a) shows the scanning signal applied to a selected scanning electrode, and FIG. 13(b) the scanning signal applied to the scanning electrodes which are not selected. FIG. 13(c) shows an electrical signal (referred to as a "white" signal) which drives a ferroelectric liquid crystal into a first stable state and FIG. 13(d) shows an electrical signal (referred to as a "black" signal) which drives the liquid crystal into a second stable state.

Figure 14:
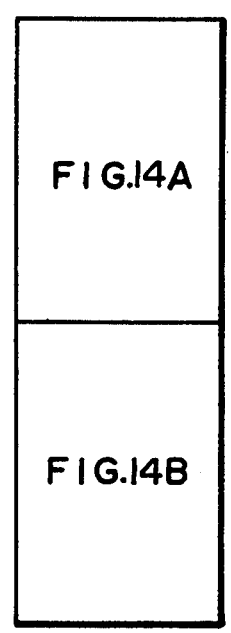
FIG. 14 (combination of FIGS. 14A and 14B) shows the waveforms of voltages applied in time series.
Figure 14A:
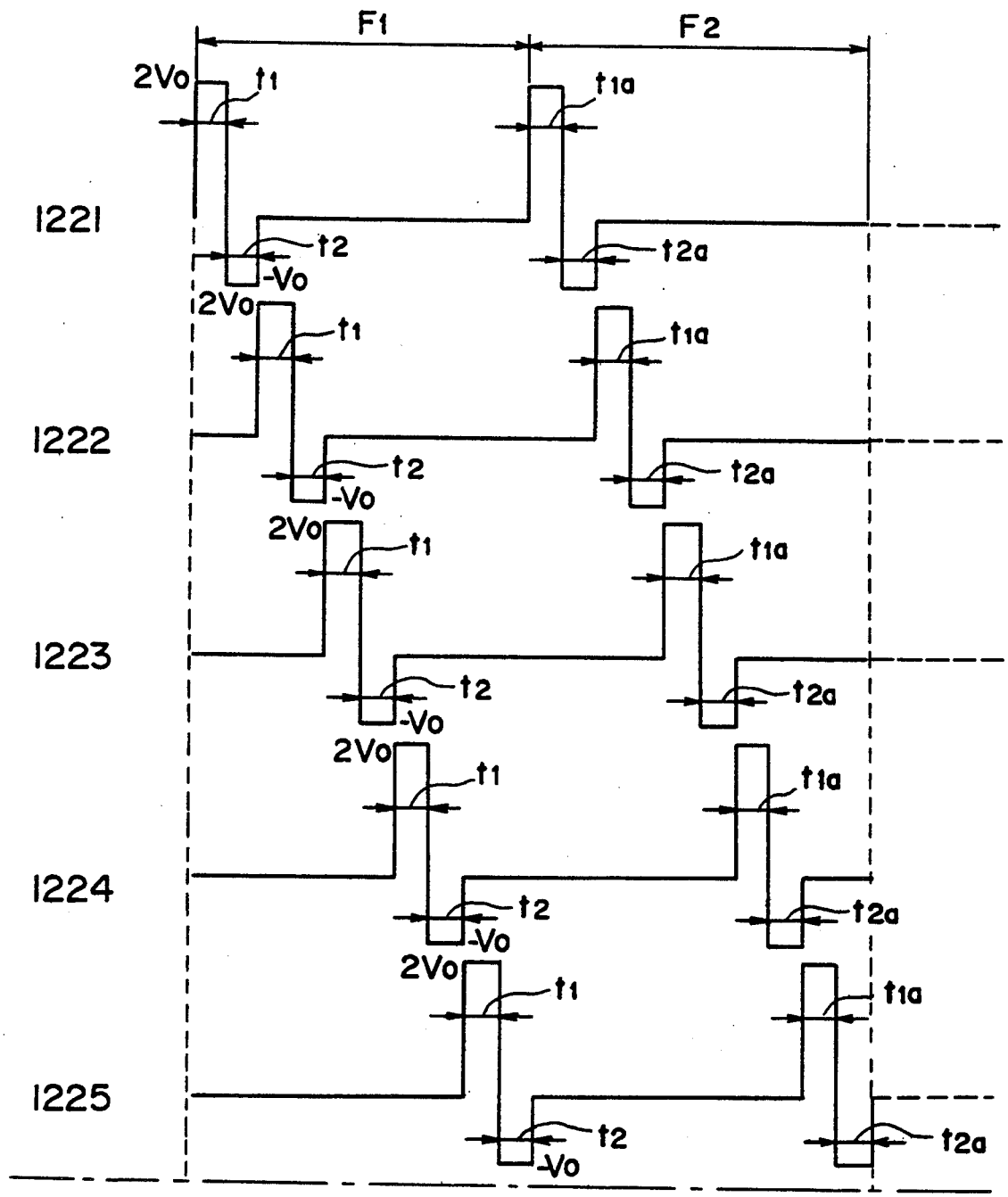
Figure 14B:
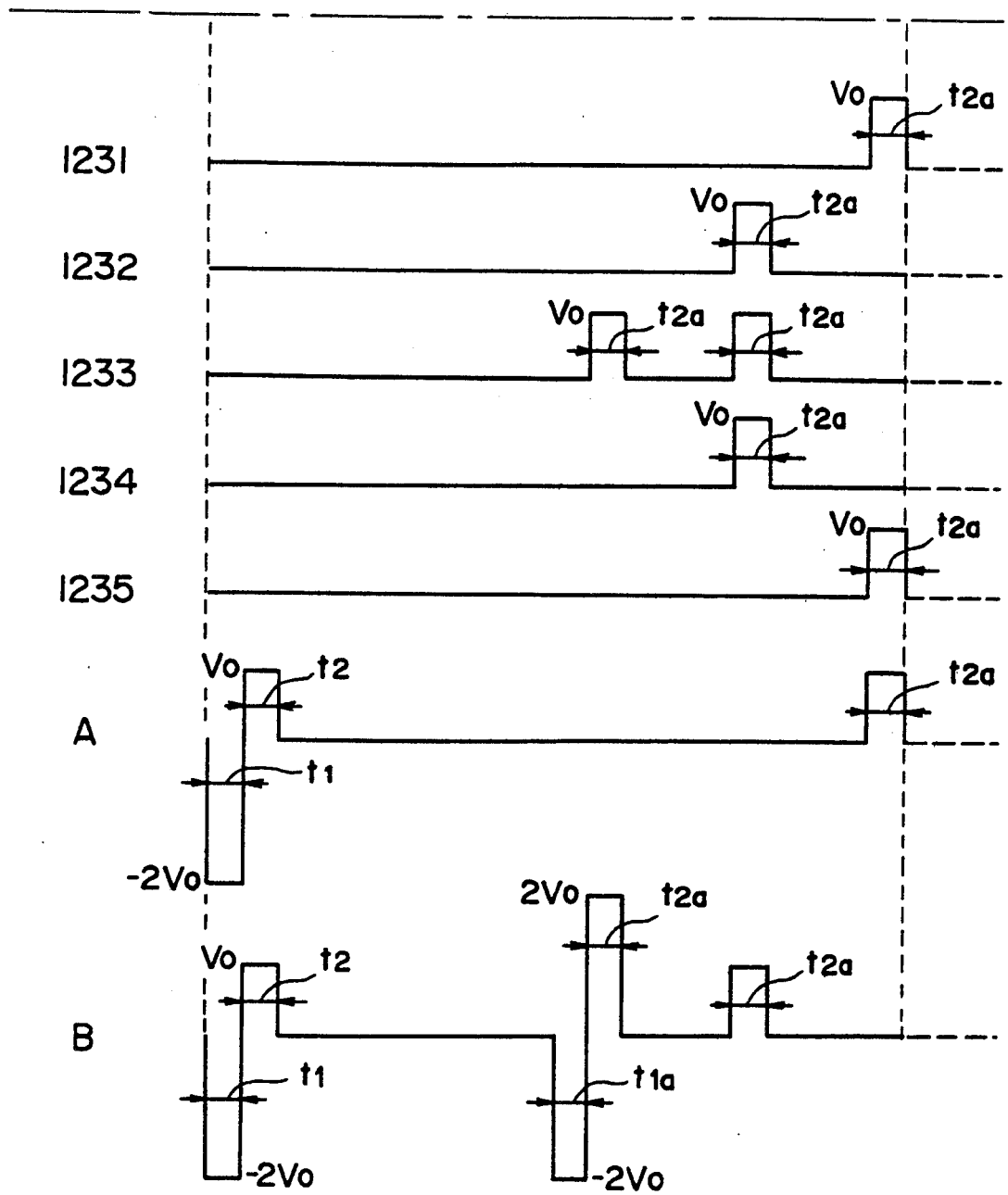

First, as shown in FIG. 14 (combination of FIGS. 14A and 14B) in a first frame $F_1$, the scanning signal is applied to the whole or a part of the scanning electrodes 122 and, in synchronism with the scanning signal, the "white" signal is applied to the whole or a part of the signal electrodes 123. In a second frame $F_2$, the "black" signal is applied to the predetermined portions as shown in FIG. 12 (black picture elements). FIG. 14 shows the waveforms of the voltages applied to the picture elements A and B, respectively, as shown in FIG. 12 and the electrical signals applied to the scanning electrodes 1221, 1222, 1223, 1224 and 1225 and to the signal electrodes 1231, 1232, 1233, 1234 and 1235.

$V_0$ is so selected that the following relations may be satisfied:

$$V_0 < Vth_1 < 2V_0,$$

and $$-V_0 > -Vth_2 > -2V_0.$$

Therefore, as is clear from FIG. 14, $-2 V_0$ is applied during the phase $t_1$ to the whole picture elements on the scanning electrode to which the scanning signal is applied (or to the picture elements to be rewritten in the case of rewriting) so that the ferroelectric liquid crystal is driven into the first stable state. During the phase $t_2$, the voltage applied to the picture elements is $V_0$, but $V_0 < Vth_1$ so that the first state ("white") into which the liquid crystal has been driven during the phase $t_1$ can be maintained. As described above, during the first frame all the picture elements are once erased to "white" in response to the "white" signal. Thereafter during the second frame $F_2$ the "black" signal which is in synchronism with the scanning signal is applied to the signal electrodes so that only the predetermined picture elements become "black". Thus one black-and-white picture is displayed. In this case, $2 V_0$ is applied during the phase $t_{2a}$ to the picture element to which the "black" signal is applied after $-2 V_0$ has been applied during the phase $t_{1a}$. As a result, the ferroelectric liquid crystal which stays in the first stable state during the phase $t_{1a}$ is caused to be driven into the second stable state during the phase $t_{2a}$ and consequently becomes "black".

The voltage V and the phase T ($=t_1+t_2$) are dependent upon a liquid crystal used and the thickness of a cell, but in general the voltage is 3–70 V while the phase is in a range between 0.1 microsecond and 2 milliseconds.

It would be apparent to those skilled in the art that in order to effectively carry out the driving method in accordance with the present invention, the electrical signals applied to the scanning and signal electrodes are not limited to simple signals having rectangular waveforms as shown in FIG. 14 and that the driving of the present invention can be carried out with signals having sinusoidal or triangular waveforms.

Figure 15:
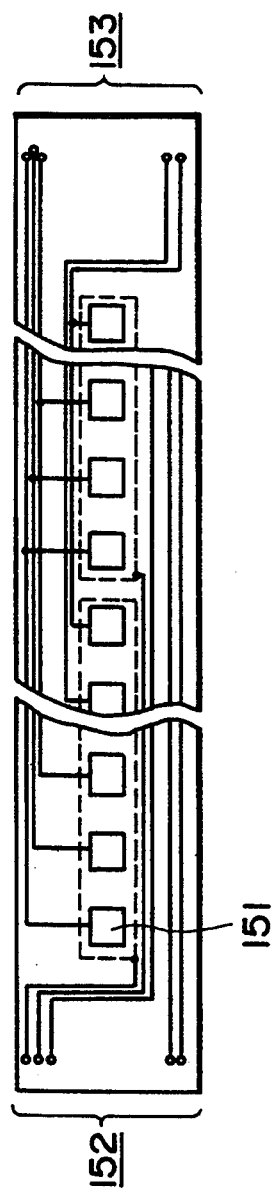
FIG. 15 is a schematic plan view of a liquid crystal optical shutter which is driven by the method of the present invention.
Figure 16A:
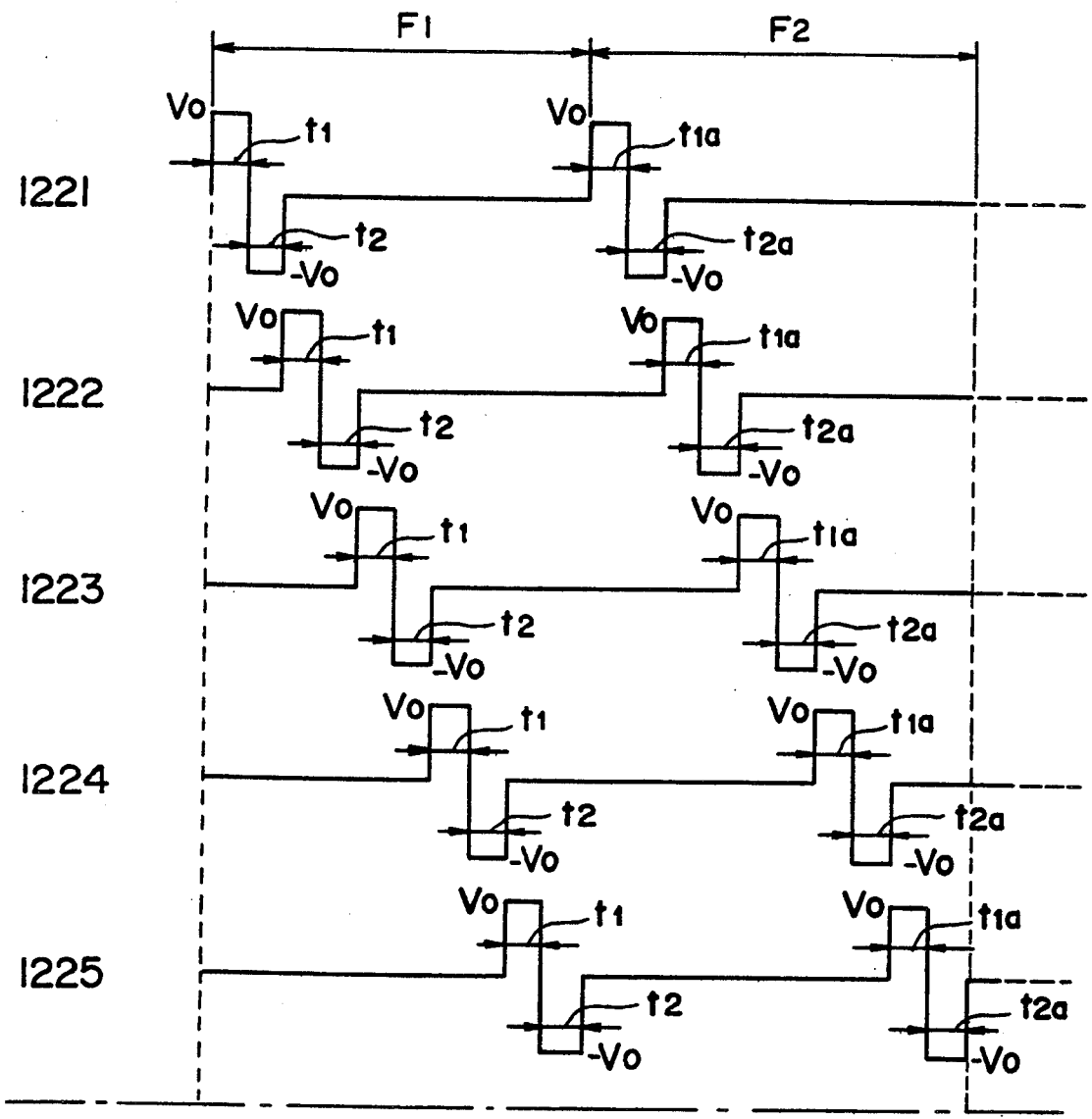
Figure 16B:
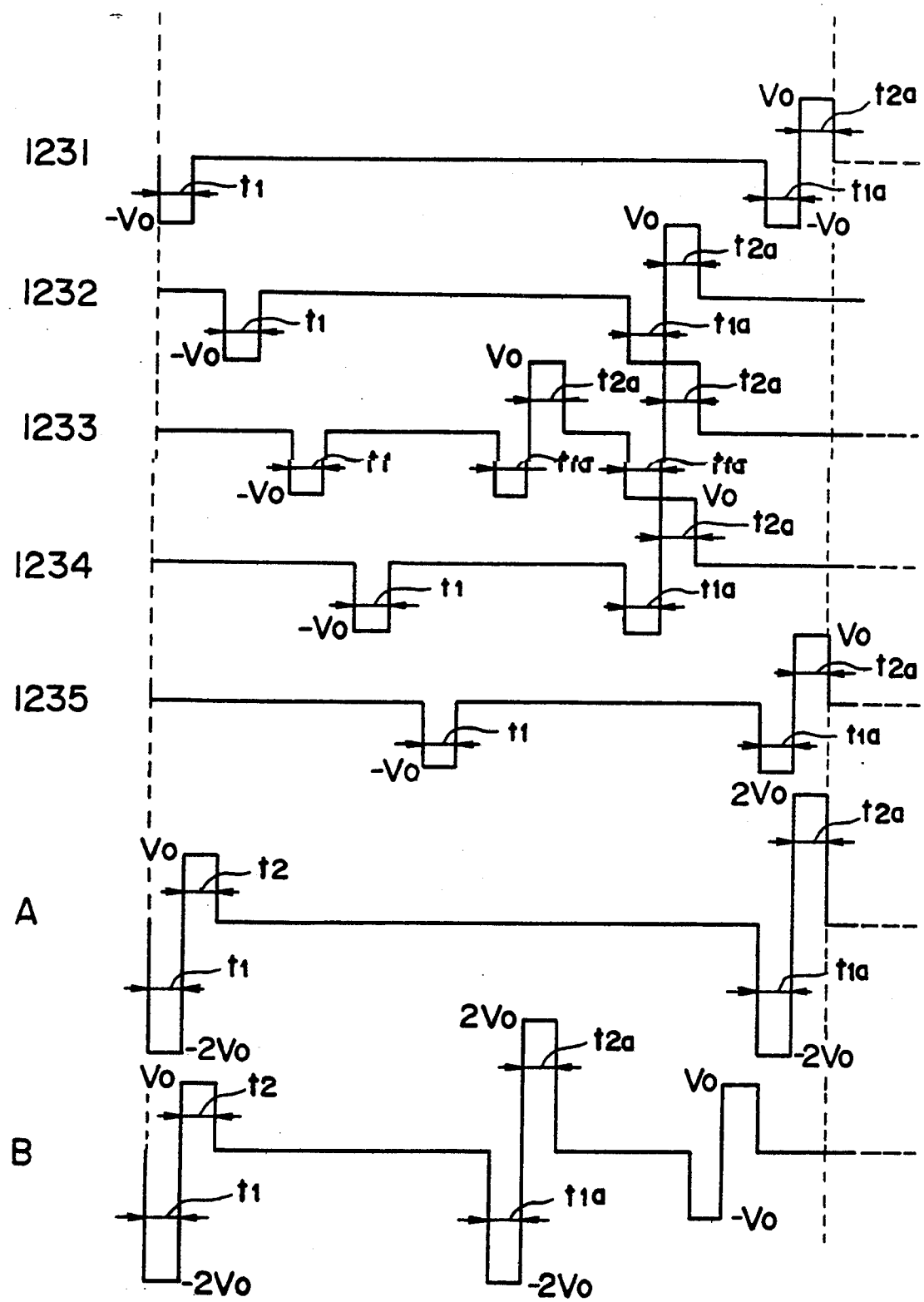
Figure 17:
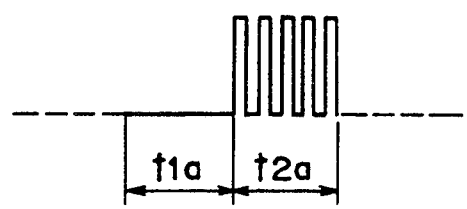
FIGS. 17(a-d) shows the waveforms of voltages applied in yet a further embodiment of the present invention.
Figure 17:
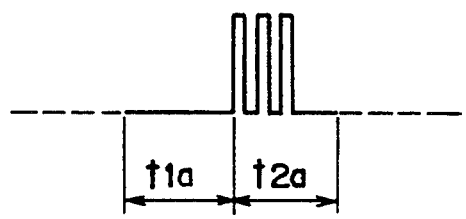
Figure 17:
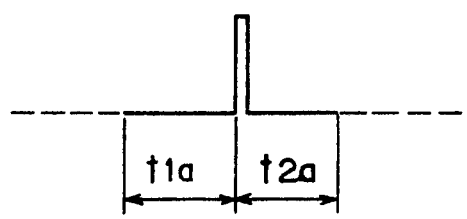
Figure 17:
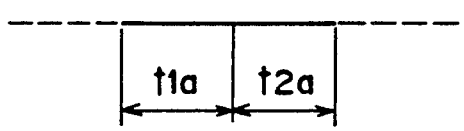

FIG. 15 shows a matrix of electrodes of a liquid crystal optical shutter which operates based upon the driving in accordance with the present invention. The optical shutter has a plurality of picture elements 151 each with opposed transparent electrodes, a group of scanning electrodes 152 and a group of signal electrodes 153.

Figure 16:
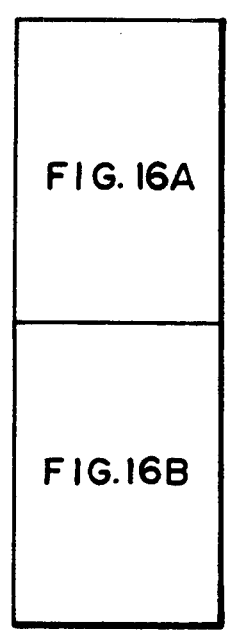
FIG. 16 (combination of FIGS. 16A and 16B) shows the waveforms of voltages applied in time series in a still further embodiment of the present invention.

FIG. 16 is a view used to explain a further embodiment of the driving in accordance with the present invention. In this embodiment, a scanning signal is sequentially applied to the scanning electrodes 122 as shown in FIG. 12 and, in synchronism with the scanning signal, a "white" signal is applied to the signal electrodes 123, so that the whole picture once becomes "white" during a first frame $F_1$. In this case, $-2 V_0$ is applied to each picture element during the phase $t_1$ and then $V_0$ which is lower than $Vth_1$ is applied during the phase $t_2$. Accordingly, the ferroelectric liquid crystal is driven into and maintained in the first stable state during the phases $t_1$ and $t_2$. Thereafter, a "black" signal is applied only to predetermined picture elements during a second frame $F_2$. The picture element (the black picture element shown in FIG. 12) to which the "black" signal is to be applied with $-2 V_0$ during a phase $t_{1a}$ and then with $2 V_0$ during a phase $t_{2a}$. As a result, the ferroelectric liquid crystal in the picture element is driven into the second stable state. The picture element B is applied with $-V_0$ and $V_0$, but $V_0$ satisfies the following relations as described before: $V_0 < V_{th1} < 2 V_0$, and $-V_0 > Vth_2 > -2 V_0$, so that the picture element B will not be reversed to "white".

So far, the liquid crystal of a picture element has been described as being uniform and the whole region of each picture element has been described as being driven into the first or second stable state. However, the orientation of a ferroelectric liquid crystal is influenced in an extremely delicate manner by the interaction between the liquid crystal and the surfaces of the base plates. Accordingly, when the difference between an applied voltage and a threshold voltage $Vth_1$ or $Vth_2$ is small, a picture element can be driven into a state in which some molecules of the liquid crystal of the picture element are driven into the first stable state while the remaining molecules into the second stable state. Therefore, it becomes possible by utilizing this phenomenon to apply a signal during the second phase of an information signal so that a gradation of a picture element can be produced. For instance, when the same scanning signals are applied as in the case of the driving described with reference to FIG. 14 or 16, it becomes possible to display a picture with a gradation by varying the number of pulses of an information signal applied to the signal electrode during the phase $t_{2a}$ as shown in FIGS. 17(a)-(d).

Further, it is possible to utilize not only the variations in surface condition of the base plates which are the natural results of the treatment of the base plates but also the conditions of the surfaces with extremely fine mosaic patterns of the base plates.

The driving in accordance with the present invention can be applied in various fields such as liquid crystal optical shutters, liquid crystal television receivers, display devices and so on.

What is claimed is:

1. A driving for driving an optical modulation device comprising: a plurality of picture elements arranged in the form of a matrix having a plurality of rows and a plurality of columns defined by the intersections of scanning electrodes arranged in rows and signal electrodes arranged in columns; and a chiral smectic liquid crystal; the picture elements in each row being selectively supplied with either a voltage for orienting the chiral smectic liquid crystal to one display state, or another voltage for orienting the chiral smectic liquid crystal to another display state; said driving method comprising the steps of:

applying a scanning selection signal comprising a former voltage of one polarity and a latter voltage of the other polarity to a particular one of the scanning electrodes to select that particular scanning electrode;

applying data signals to the signal electrodes, each data signal comprising an information signal for selecting a display state of a picture element on the particular scanning electrode and an auxiliary signal having a voltage polarity opposite to that of the information signal, whereby the picture elements on the particular scanning electrode supplied with the former voltage of one polarity are non-selectively erased into one display state and the picture elements on the particular scanning electrode supplied with the voltage of the other polarity are respectively selected in display states depending on the information signals applied in synchronism with the latter voltage of the other polarity, the voltage polarities being determined with respect to the voltage level of a scanning electrode to which the scanning selection signal is not applied; and applying the former voltage of one polarity of a subsequent scanning selection signal to a scanning electrode selected subsequent to the particular scanning electrode during the period of applying the data signals for selecting the display states of the picture elements on said particular scanning electrode.

2. The driving method according to claim 1, wherein a relation $T_1 \geq T_2$ is satisfied, where $T_1$ is the pulse duration of a said information signal, and $T_2$ is the pulse duration of a said auxiliary signal.

3. The driving method according to claim 1, wherein said chiral smectic liquid crystal is in C, H, I, J, K, G or F phase.

4. The driving method according to claim 1, wherein said chiral smectic liquid crystal is in C or H phase.

5. A driving method according to claim 1, wherein the period for application of the scanning selection signal has a duration of 3 $\Delta T$, where $\Delta T$ is the pulse duration of each of said information signal and said auxiliary signal.

6. A driving method according to claim 1, wherein the voltage waveform of the information signal is varied depending on given gradation data.

7. A driving method according to claim 6, wherein the picture element supplied with the voltage waveform varied depending on given gradation data comprises chiral smectic liquid crystal molecules in both one and the other orientation states.

8. A driving method according to claim 6, wherein the picture element supplied with the voltage waveform varied depending on given gradation data comprises chiral smectic liquid crystal molecules in both one and the other orientation states.

9. An optical modulation apparatus, comprising an optical modulation device having:

a plurality of picture elements arranged in the form of a matrix having a plurality of rows and a plurality of columns;

scanning electrodes arranged in rows and signal electrodes arranged in columns defining said matrix of picture elements;

a chiral smectic liquid crystal with bistable orientation; and driving means for a) applying a scanning selection signal comprising a former voltage of one polarity and a latter voltage of the other polarity to a particular one of the scanning electrodes to select that particular scanning electrode, and applying data signals to the signal electrode, each data signal comprising an information signal for selecting a display state of a picture element on the particular scanning electrode and an auxiliary signal having a voltage polarity opposite to that of the information signal, whereby the picture elements on the particular scanning electrode supplied with the former voltage of one polarity are non-selectively erased into one display state and the picture elements on the particular scanning electrode supplied with the latter voltage of the other polarity are respectively placed in display states depending upon the information signals applied in synchronism with the latter voltages of the other polarity, the voltage polarities being determined with respect to the voltage level of a scanning electrode to which the scanning selection signal is not applied; and b) applying the former voltage of one polarity of a subsequent scanning selection signal to a scanning electrode selected subsequent to said particular scanning electrode during the period of applying the data signals for selecting the display states of the pixels on said particular scanning electrode.

10. An optical modulation apparatus according to claim 9, wherein the period for application of the scanning selection signal has a duration of 3 $\Delta T$, where $\Delta T$ is the pulse duration of each of said information signal and said auxiliary signal.

11. An optical modulation apparatus according to claim 9, which includes means for varying the voltage waveform of the information signal depending on given gradation data.

12. An optical modulation apparatus, comprising an optical modulation device having:

a plurality of picture elements arranged in the form of a matrix having a plurality of rows and a plurality of columns;

scanning electrodes arranged in rows and signal electrodes arranged in columns defining said matrix of picture elements;

a chiral smectic liquid crystal disposed between the scanning electrodes and signal electrodes; and driving means for a) applying a scanning selection signal comprising a former voltage of one polarity and a latter voltage of the other polarity to a particular one of the scanning electrodes to select that particular scanning electrode, and applying data signals to the signal electrodes, each data signal comprising an information signal for selecting a display state of a picture element on the particular scanning electrode and an auxiliary signal having a voltage polarity opposite to that of the information signal, so that the picture elements on the particular scanning electrode supplied with the former voltage of one polarity are non-selectively erased into one display state and the picture elements on the particular scanning electrode supplied with the latter voltage of the other polarity are respectively selected in display states depending on the information signals applied in synchronism with the latter voltages of the other polarity, the voltage polarities being determined with respect to the voltage level of a scanning electrode to which the scanning selection signal is not applied;

b) applying the former voltage of one polarity of a subsequent scanning selection signal to a scanning electrode selected subsequent to the particular scanning electrode during the period of applying the data signals for selecting the display states of the picture elements on said particular scanning electrode; and c) applying an AC voltage which does not change the select display states of the picture elements on the particular scanning electrode to the pixels when the particular scanning electrode is not supplied with the scanning selection signal.

13. An optical modulation apparatus according to claim 12, wherein the former voltage of one polarity and the latter voltage of the other polarity have different peak values.

14. A method according to claim 12, wherein the AC voltage comprises no DC component.

15. An optical modulation apparatus, comprising an optical modulation device having:

a plurality of picture elements arranged in the form of a matrix having a plurality of rows and a plurality of columns;

scanning electrodes arranged in rows and signal electrodes arranged in columns defining said matrix of picture elements;

a chiral smectic liquid crystal disposed between the scanning electrodes and the signal electrodes; and driving means for a) applying a scanning selection signal comprising a former voltage of one polarity and a latter voltage of the other polarity to a particular one of the scanning electrodes to select that particular scanning electrode, and applying data signals to the signal electrodes, each data signal comprising both (i) an information signal having a voltage waveform which varies depending on given gradation data so that the picture elements on the particular scanning electrode supplied with the former voltage of one polarity are non-selectively erased into one display state and (ii) the picture elements on the particular scanning electrode supplied with the latter voltage of the other polarity are respectively selected in gradational display states depending on the information signals applied in synchronism with the latter voltage of the other polarity, the voltage polarities being determined with respect to the voltage level of a scanning electrode to which the scanning selection signal is not applied;

b) applying the former voltage of one polarity of a subsequent scanning selection signal to a scanning electrode selected subsequent to said particular scanning electrode during the period of applying the scanning selection signal to said particular scanning electrode; and c) applying an AC voltage to preclude changing the selected display states of the picture elements on the particular scanning electrode while the particular scanning electrode is not supplied with the scanning selection signal.

16. An optical modulation apparatus according to claim 15, wherein a picture element which is supplied with the voltage waveform which varies depending on given gradation data comprises chiral smectic liquid crystal molecules in both one and the other orientation states.

17. In a matrix line-at-a-time driving apparatus of a liquid crystal device having a ferroelectric liquid crystal interposed between X and Y electrodes and pixels arranged in lines, a liquid crystal driving apparatus comprising:

a first driving means for applying a voltage of one polarity simultaneously to the pixels for one line to bring said pixels into a first transmission stable state; and second driving means for applying a voltage to each of said pixels in said line, said voltage being either of the other polarity to bring said pixels into a second light transmission stable state or effective to hold the first light transmission state in accordance with display signals, and wherein said pixels of an (N+1)th line are driven by said first driving means when said pixels of an Nth line are driven by said second driving means.

18. An apparatus as defined in claim 17, wherein the first driving means voltage is effective for causing each liquid crystal pixel in a line to have a light ON state and the driving voltage of opposite polarity from the second driving means is effective for causing a liquid crystal pixel previously in a light ON state to transfer to a light OFF state.

19. In a matrix line-at-a-time driving apparatus of a liquid crystal device having a ferroelectric liquid crystal interposed between X and Y electrodes and pixels arranged in lines, a liquid crystal driving apparatus comprising:

first driving means for applying a voltage of one polarity simultaneously to the pixels for one line to bring said pixels into a first transmission stable state;

second driving means responsive to signals relating to information that is to be displayed, said second driving means being effective to apply one of two voltages to each pixel in said one line, one of said voltages having a polarity opposite to said one polarity, and being effective to bring a pixel into a second light transmission stable state;

and the other of said two voltages being of a magnitude and polarity to hold a pixel in the first light transmission stable state, and means advancing the first driving means to apply its voltage simultaneously to the pixels of a second line in said matrix during the same time interval that the pixels of said one line are driven by said second driving means.

20. The apparatus as defined in claim 19 wherein the first driving means voltage is effective for causing each liquid crystal pixel in a line to have a light ON state and the driving voltage of opposite polarity from the second driving means is effective for causing a liquid crystal pixel previously in a light ON state to transfer to a light OFF state.

21. A of operating a liquid crystal display device which includes a matrix of ferroelectric liquid crystals aligned as pixels in parallel lines, the comprising the steps of:

applying a first voltage of a first polarity during a first time interval simultaneously to all of the pixels in a first line of said matrix to bring all of the pixels to the uniform light transmission stable state;

providing a pattern of voltages which voltages have either an opposite or same polarity as said first voltage in accordance with a desired display with the voltages of opposite polarity being effective to bring associated pixels within a second light transmission stable state; and applying said pattern of voltages during a second time interval to the pixels of said first line to produce a stable display according to the applied voltage pattern while concurrently applying a first voltage of a first polarity simultaneously of all of the pixels in a second line of said matrix to bring all of the pixels in said second line into a uniform light transmission stable state.

22. A according to claim 21 further comprising the steps of:

providing a second pattern of voltages which voltages have either an opposite or same polarity as said first voltage in accordance with a desired display for said second line with the voltages of opposite polarity being effective to bring associated pixels within a second light transmission stable state; and applying said pattern of voltages during a third time interval to the pixels of said second line to produce a stable display according to the second applied voltage pattern which concurrently applying a first voltage of a first polarity simultaneously to all of the pixels in a third line of said matrix to bring all of the pixels in said third line into a uniform light transmission stable state.

23. A driving for an optical modulation device of the type in which a group of scanning electrodes and a group of signal electrodes are so arranged that picture elements are defined at the respective intersections of the scanning and signal electrodes, and in which a chiral smectic liquid crystal is interposed between the group of scanning electrodes and the group of signal electrodes, the driving comprising the steps of, in a writing period for a selected N-th scanning electrode having at least a first phase and a second phase:

applying to the selected N-th scanning electrode a scanning selection signal having a first voltage of one polarity in the first phase and a voltage of another polarity in the second phase with respect to the voltage level of a non-selected scanning electrode other than the N-th scanning electrode and a selected N-th+1 scanning electrode;

applying to the selected N-th+1 scanning electrode a signal having a second voltage of one polarity with respect to the voltage level of the non-selected scanning electrode in a phase after the first phase during the writing period for the selected N-th scanning electrode;

in the first phase, orienting the chiral smectic liquid crystal at the picture elements on the selected N-th scanning electrode to one stable state thereof by applying a combination of scanning selection signal having the first voltage of one polarity to the selected N-th scanning electrode and a voltage signal to a plurality of signal electrodes intersecting the selected N-th scanning electrode, and simultaneously applying a signal having a voltage not exceeding a threshold voltage of the chiral smectic liquid crystal to the picture elements on the selected N-th+1 scanning electrode;

in the second phase, orienting the chiral smectic liquid crystal at a selected picture element on the selected N-th scanning electrode to another stable state thereof by applying a combination of the scanning selection signal having the voltage of the other polarity to the selected N-th scanning electrode and a voltage signal to a signal electrode intersecting the selected N-th scanning electrode;

in the phase after the first phase, orienting the chiral smectic liquid crystal at the picture elements on the selected N-th+1 scanning electrode to one stable state thereof by applying a combination of the signal having the second voltage of one polarity to the selected N-th+1 scanning electrode and voltage signal to a plurality of signal electrodes intersecting the selected N-th+1 scanning electrode; and in the writing period for the N-th scanning electrode, applying a signal having a voltage not exceeding the threshold of the chiral smectic liquid crystal to the picture elements on the non-selected scanning electrode.

24. The driving according to claim 23, wherein the chiral smectic liquid crystal is in C, H, I, J, K, G or F phase.

25. The driving according to claim 23, wherein the chiral smectic liquid crystal is in C or H phase.

26. The driving according to claim 23, wherein the chiral smectic liquid crystal is disposed in a layer thin enough to release the helical structure of the chiral smectic liquid crystal in the absence of an electric field.

27. The driving according to claim 23, wherein each of the first and second phases has a duration of T and the period for application of the scanning selection signal has a duration of $T_1$ satisfying the relation of $T_1 = 2T$.

28. An optical modulation device of the type in which a group of scanning electrodes and a group of signal electrodes are so arranged that picture elements are defined at the respective intersections of said scanning and signal electrodes, and in which a chiral smectic liquid crystal is interposed between said group of scanning electrodes and said group of signal electrodes; said optical modulation device employing a driving comprising the steps of, in a writing period for a selected N-th scanning electrode including at least a first phase and a second phase:

applying to said selected N-th scanning electrode a scanning selection signal having a first voltage of one polarity in the first phase with respect to the voltage level of a non-selected scanning electrode other than said selected N-th scanning electrode and a selected N-th+1 scanning electrode, and a voltage of the other polarity in the second phase with respect to the voltage level of a non-selected scanning electrode other than said selected N-th scanning electrode and a selected N-th+1 scanning electrode;

applying to said selected N-th+1 scanning electrode a scanning selection signal having a second voltage of one polarity with respect to the voltage level of said non-selected scanning electrode in a phase after the first phase during the writing period for said selected N-th scanning electrode;

in the first phase, orienting the chiral smectic liquid crystal at said picture elements on said selected N-th scanning electrode to one stable state thereof by applying a combination of the scanning selection signal having said first voltage of one polarity and a voltage signal to a plurality of signal electrodes intersecting said selected N-th scanning electrode, and simultaneously applying a signal having a voltage not exceeding a threshold voltage of the chiral smectic liquid crystal to said picture elements on said selected N-th+1 scanning electrode;

in the second phase, orienting the chiral smectic liquid crystal at a selected picture element on said selected N-th scanning electrode to another stable state thereof by applying a combination of the scanning selection signal having the voltage of the other polarity and a voltage signal to a signal electrode intersecting said selected N-th scanning electrode;

in the phase after the first phase, orienting the chiral smectic liquid crystal at said picture elements on said selected N-th+1 scanning electrode to one stable state thereof by applying a combination of the signal having the second voltage of one polarity and a voltage signal to a plurality of signal electrodes intersecting said selected N-th+1 scanning electrode; and in the writing period for said selected N-th scanning electrode, applying a signal having a voltage not exceeding the threshold of the chiral smectic liquid crystal to said picture elements on said non-selected scanning electrode.

29. The optical modulation device according to claim 28, wherein each of the first and second phases has a duration of T and the period for application of the scanning selection signal has a duration of $T_1$ satisfying the relation of $T = 2T$.

* * * * *

UNITED STATES PATENT AND TRADEMARK OFFICE
CERTIFICATE OF CORRECTION

PATENT NO. : 5,381,254
DATED : January 10, 1995
INVENTOR(S) : JUNICHIRO KANBE, ET AL.

It is certified that error appears in the above-identified patent and that said Letters Patent is hereby corrected as shown below:

COLUMN 1

Line 57, "perpendicular" should read --perpendicular to--.

COLUMN 4

Line 14, "an" should be deleted.
Line 67, "lapplying" should read --applying--.

COLUMN 5

Line 38, "(HOBACPC)," should read --(DOBAMBC),--.
Line 67, "a" should read --and--.

COLUMN 7

Line 38, "$V_o<Vth_1>V_o$," should read --$V_o<Vth_1<2V_o$,--.

COLUMN 9

Line 65, "$A^3$" should read --$A_3$--.

COLUMN 12

Line 36, "<2  $V_o$," should read --<$2V_o$,--.

COLUMN 13

Line 4, "driving" (first occurrence) should read --driving method--.

UNITED STATES PATENT AND TRADEMARK OFFICE
CERTIFICATE OF CORRECTION

PATENT NO. : 5,381,254
DATED : January 10, 1995
INVENTOR(S) : JUNICHIRO KANBE, ET AL.

It is certified that error appears in the above-identified patent and that said Letters Patent is hereby corrected as shown below:

COLUMN 13

Line 46, "relation" should read --relation of--.
Line 63, "the" (first occurrence) should read --a--.

COLUMN 16

Line 23, "a" (first occurrence) should be deleted.
Line 66, "claim 19" should read --claim 19,--.

COLUMN 17

Line 5, "A of" should read --A method of--.
Line 7, "the comprising" should read --the method comprising--.
Line 27, "A according" should read --A method according--.
Line 39, "which" should read --while--.
Line 44, "driving for" should read --driving method for--.

COLUMN 18

Line 33, "driving" should read --driving method--.
Line 36, "driving" should read --driving method--.
Line 38, "driving" should read --driving method--.
Line 42, "driving" should read --driving method--.
Line 43, "of T" should read --of $\Delta T$--.
Line 46, "T1=2 T." should read --$T_1 = 2\Delta T$--.

UNITED STATES PATENT AND TRADEMARK OFFICE
CERTIFICATE OF CORRECTION

PATENT NO. : 5,381,254
DATED : January 10, 1995
INVENTOR(S) : JUNICHIRO KANBE, ET AL.

It is certified that error appears in the above-identified patent and that said Letters Patent is hereby corrected as shown below:

COLUMN 20

Line 20, "T" should read --$\Delta T$--.
Line 22, "T=2 T." should read --$T_1=2\Delta T$.--.

Signed and Sealed this

First Day of August, 1995

BRUCE LEHMAN

Attest:

Attesting Officer

Commissioner of Patents and Trademarks